US011718359B2

(12) United States Patent
Yamamoto et al.

(10) Patent No.: US 11,718,359 B2
(45) Date of Patent: Aug. 8, 2023

(54) OUTPUT DEVICE, METHOD FOR GENERATING A MACHINE LEARNING MODEL, AND COMPUTER PROGRAM

(71) Applicant: SHIMANO Inc., Sakai (JP)

(72) Inventors: Takashi Yamamoto, Sakai (JP); Satoshi Shahana, Sakai (JP)

(73) Assignee: Shimano Inc., Sakai (JP)

( * ) Notice: Subject to any disclaimer, the term of this patent is extended or adjusted under 35 U.S.C. 154(b) by 90 days.

(21) Appl. No.: 16/925,659

(22) Filed: Jul. 10, 2020

(65) Prior Publication Data
US 2021/0009226 A1 Jan. 14, 2021

(30) Foreign Application Priority Data
Jul. 12, 2019 (JP) .................. 2019-130347

(51) Int. Cl.
*B62J 45/20* (2020.01)
*G06N 3/08* (2023.01)
*G06N 20/00* (2019.01)
*B62J 43/13* (2020.01)

(52) U.S. Cl.
CPC .............. *B62J 45/20* (2020.02); *B62J 43/13* (2020.02); *G06N 3/08* (2013.01); *G06N 20/00* (2019.01)

(58) Field of Classification Search
CPC ........... B62J 45/20; B62J 43/13; G06N 20/00; G06N 3/08
See application file for complete search history.

(56) References Cited

U.S. PATENT DOCUMENTS

| 2008/0167797 A1* | 7/2008 | Geelen ............... G01C 21/3691 701/532 |
| 2012/0197828 A1* | 8/2012 | Yi ............................. G06F 1/32 700/291 |
| 2013/0166125 A1* | 6/2013 | Yamamoto .......... B60L 15/2045 180/65.265 |
| 2014/0070930 A1* | 3/2014 | Hara ........................ B62J 45/20 340/432 |
| 2016/0209226 A1 | 7/2016 | Nagy et al. |
| 2017/0050080 A1* | 2/2017 | Mizuochi ............... G16H 20/30 |

(Continued)

FOREIGN PATENT DOCUMENTS

CN 109478848 A * 3/2019 ............. G05B 15/02
DE 102016218499 A1 3/2018
(Continued)

*Primary Examiner* — Joseph H Feild
*Assistant Examiner* — Rufus C Point
(74) *Attorney, Agent, or Firm* — Alleman Hall Creasman & Tuttle LLP

(57) ABSTRACT

Provided are an output device, a method for generating a machine learning model, and a computer-readable storage medium for properly controlling a human-powered vehicle so as to travel comfortably for a long time by using a machine learning model. The output device includes an acquisition unit that acquires input information related to traveling of a human-powered vehicle, and a processor configured to train a machine learning model in accordance with an index value indicating electric power consumption efficiency in a power supply device for supplying electric power to a component of the human-powered vehicle, and to output output information related to controlling the component when the input information is inputted.

17 Claims, 11 Drawing Sheets

(56) References Cited

U.S. PATENT DOCUMENTS

| | | | | |
|---|---|---|---|---|
| 2017/0096143 A1* | 4/2017 | Murrish | ................ | B60W 50/14 |
| 2020/0017117 A1* | 1/2020 | Milton | ................ | B60W 50/02 |
| 2020/0247498 A1* | 8/2020 | Yamamoto | ............. | B62J 45/411 |
| 2020/0407015 A1* | 12/2020 | Shahana | ................ | B62M 9/123 |
| 2021/0009226 A1* | 1/2021 | Yamamoto | ............. | G06N 3/006 |

FOREIGN PATENT DOCUMENTS

| | | | | |
|---|---|---|---|---|
| DE | 102017127381 A1 | | 5/2018 | |
| DE | 102018115016 A1 | | 12/2018 | |
| DE | 102019118282 A1 | | 1/2020 | |
| JP | H08327124 A | | 12/1996 | |
| JP | 2002205683 A | * | 7/2002 | ............ B60L 11/007 |
| JP | 4083135 B | | 4/2008 | |
| JP | 2011178341 A | | 9/2011 | |
| JP | 2012121338 A | | 6/2012 | |
| JP | 2014069689 A | | 4/2014 | |
| JP | 2014098617 A | | 5/2014 | |
| JP | 6012376 B2 | | 10/2016 | |
| JP | 2018089989 A | | 6/2018 | |

\* cited by examiner

OUTPUT DEVICE, METHOD FOR GENERATING A MACHINE LEARNING MODEL, AND COMPUTER PROGRAM

CROSS-REFERENCE TO RELATED APPLICATIONS

The subject application claims priority to Japanese Pat. App. Ser. No. 2019-130347, filed Jul. 12, 2019, the entire contents of which are hereby incorporated by reference for all purposes.

TECHNICAL FIELD

The present disclosure relates to an output device related to controlling a component of a human-powered vehicle, a method for generating a machine learning model, and a computer program.

BACKGROUND ART

Human-powered vehicles at least partially utilizing man power have been known, including a bicycle, an electric bicycle called an e-bike and so on. The human-powered vehicle disclosed in Patent Document 1, for example, is provided with components including a transmission, a brake device, a seat post, a suspension, and the like. The components are supplied with electric power from a power supply device that is mounted to the human-powered vehicle.

PRIOR ART DOCUMENT

Patent Document

[Patent Document 1] Japanese Patent Application Laid-Open No. 2018-089989

SUMMARY OF INVENTION

Problems to be Solved by Invention

In Patent Document 1, the components are operated by using electric power supplied from the power supply device in accordance with an operation instruction from an operating device, though management of electric power supplied from the power supply device is not taken into account.

It is one object of the present disclosure to provide an output device, a method for generating a machine learning model and a computer program that are capable of properly controlling a component depending on a traveling state with electric power consumption reduced by using a machine learning model.

Means for Solving Problems

An output device according to the first aspect of the present disclosure comprises an acquisition unit that acquires input information related to traveling of a human-powered vehicle, and a processor configured to train a machine learning model in accordance with an index value indicating electric power consumption efficiency in a power supply device for supplying electric power to a component of the human-powered vehicle, and to output output information related to controlling the component when the input information is inputted.

According to the output device in the first aspect, the output information related to controlling a component is outputted in accordance with the input information while the electric power consumption efficiency is maintained well, and thus by using the output information, a component is properly controlled in accordance with the travel state with the electric power consumption of the power supply device reduced. By using the output information, the user can comfortably travel the human-powered vehicle over a longer time period.

In an output device of the second aspect according to the first aspect of the present disclosure, the index value is a value related to a travel distance obtained before electric power in the power supply device is equal to or less than a preset value.

According to the output device in the second aspect, by using the output information, the user can comfortably travel the human-powered vehicle over a longer distance.

In an output device of the third aspect according to the first aspect of the present disclosure, the index value is a value related to an amount of electric power outputted from the power supply device.

According to the output device in the third aspect, the amount of electric power outputted from the power supply device can be reduced.

In an output device of the fourth aspect according to any one of the first to the third aspect of the present disclosure, the output information is information related to at least one of an assist ratio in an assist mechanism configured to assist propulsion of the human-powered vehicle by electric power supplied from the power supply device and an upper limit value of an assist force by the assist mechanism.

According to the output device in the fourth aspect, by using the output information, at least one of the assist ratio and the assist force for the assist mechanism can properly be controlled.

In an output device of the fifth aspect according to any one of the first to the fourth aspect of the present disclosure, the output information is information related to a gear stage or a gear ratio of a transmission of the human-powered vehicle.

According to the output device in the fifth aspect, by using the output information, the gear stage or the gear ratio for the transmission can properly be controlled.

In an output device of the sixth aspect according to any one of the first to the fourth aspect of the present disclosure, the output information is information related to a number of rotations of an electric motor driven by electric power supplied from the power supply device.

According to the output device in the sixth aspect, by using the output information, the number of rotations of the electric motor can properly be controlled.

An output device of the seventh aspect according to any one of the first to the sixth aspect of the present disclosure outputs output information that allows comfortability of a user for operation of a component of the human-powered vehicle that is traveling to fall within a preset range, in accordance with the output information outputted from the machine learning model.

According to the output device in the seventh aspect, by using the output information, a component can be controlled without loss of the comfortability of the user and with electric power consumption efficiency maintained well.

In an output device of the eighth aspect according to any one of the first to the seventh aspect of the present disclosure, the input information includes at least one of information on a cadence of a crank in the human-powered vehicle, information on a torque of the crank, information on power obtained by calculation using the information on a cadence and the information on a torque.

According to the output device in the eighth aspect, the output information taking a load on the user into account can be outputted.

In an output device of the ninth aspect according to any one of the first to the eighth aspect of the present disclosure, the component includes an electric motor driven by electric power supplied from the power supply device, and the input information is information related to at least one of a torque of the electric motor, an amount of current of the electric motor, a voltage value of the electric motor and a temperature of the electric motor.

According to the output device in the ninth aspect, by using the output information, at least one of the amount of current, voltage value and temperature of the electric motor included in a component can properly be controlled.

In an output device of the tenth aspect according to any one of the first to the ninth aspect of the present disclosure, the input information includes information related to an amount of electric power remaining in the power supply device.

According to the output device in the tenth aspect, the output information taking the amount of electric power remaining in the power supply device into account can be outputted.

In an output device of the eleventh aspect according to any one of the first to the tenth aspect of the present disclosure, the input information includes detection data related to an attitude of the human-powered vehicle.

According to the output device in the eleventh aspect, the output information taking an inclination of the road into account can be outputted.

In an output device of the twelfth aspect according to any one of the first to the eleventh aspect of the present disclosure, the input information includes detection data related to a traveling environment of the human-powered vehicle.

According to the output device in the twelfth aspect, the output information taking a traveling environment into account can be outputted.

In an output device of the thirteenth aspect according to any one of the first to twelfth aspects of the present disclosure, the processor trains the machine learning model by reinforcement learning using the index value as a reward.

According to the output device in the thirteenth aspect, the machine learning model can be trained by reinforcement learning, and thus use of the output information allows a component to be more properly controlled depending on the travel state with the electric power consumption of the power supply device reduced.

In an output device of the fourteenth aspect according to the thirteenth aspect of the present disclosure, the processor is configured to execute reinforcement learning by using, as a reward, a value indicating comfortability based on an evaluation for a cadence and a torque of the crank of the human-powered vehicle that is traveling.

According to the output device in the fourteenth aspect, by using the output information, a component can be controlled to allow the user to feel the load on the user comfortable with the electric power consumption reduced, and thus the user can comfortably travel the human-powered vehicle.

An output device of the fifteenth aspect according to the thirteenth aspect of the present disclosure comprises an operating unit that is configured to input operation information for operating the component. In the output device, the processor is configured to provide output information with a reward based on collation of output information outputted from the machine learning model in accordance with input information acquired by the acquisition unit with operation information inputted by the operating unit.

According to the output device in the fifteenth aspect, the machine learning model is trained in accordance with the output information and the input information inputted by the user operating the operating unit, and thus the component can be more properly controlled by the output information.

An output device of the sixteenth aspect according to the first to the twelfth aspect of the present disclosure comprises an output unit that is configured to output information related to controlling a component of the human-powered vehicle that is outputted by the machine learning model; and an evaluation input unit that is configured to input an evaluation indicating comfortability of a user after the component is operated in accordance with the output information. In the output device, the machine learning model is configured to be updated in accordance with training data including a detail of the evaluation inputted, output information outputted from the machine learning model at a timing when the evaluation is inputted, and input information inputted in accordance with the output information.

According to the present aspect in the sixteenth aspect, the machine learning model is trained in accordance with an evaluation by the user for the result of the control of the component using the output information, and thus the component can be more properly controlled by the output information.

In an output device of the seventeenth aspect according to the first to the sixteenth aspect of the present disclosure, the output unit is configured to output information indicating a result of controlling a component.

According to the output device in the seventeenth aspect, the user can understand that a component is automatically controlled.

A method for generating a machine learning model according to the eighteenth aspect of the present disclosure comprises configuring a neural network to output output information related to controlling a component of a human-powered vehicle when input information related to traveling of the human-powered vehicle is inputted; acquiring input information related to traveling of the human-powered vehicle; identifying output information outputted by providing the neural network with the input information acquired; and training a weight in an intermediate layer of the neural network such that an index value indicating electric power consumption efficiency in a power supply device configured to supply electric power to the component is improved when the component is controlled in accordance with the output information identified.

According to a method for generating a machine learning model in the eighteenth aspect, a machine learning model outputting output information for properly controlling a component depending on a travel state can be generated while the electric power consumption efficiency is well maintained.

A computer-readable storage medium according to the nineteenth aspect of the present disclosure comprises instructions configured to be executed by a processor of a computer to cause the processor to execute processing steps of configuring a neural network to output output information related to controlling a component of a human-powered vehicle when input information related to traveling of the human-powered vehicle is inputted; acquiring input information related to traveling of the human-powered vehicle; identifying output information outputted by providing the neural network with the input information acquired; and training a weight in an intermediate layer of the neural network such that an index value indicating electric power consumption efficiency in a power supply device configured to supply electric power to the component is improved when the component is controlled in accordance with the output information identified.

According to a computer-readable storage medium in the nineteenth aspect, a machine learning model outputting output information for properly controlling a component depending on the travel state can be generated by the computer while the electric power consumption efficiency is well maintained.

Effects of Invention

According to the output device for outputting data related to controlling the human-powered vehicle, the method for generating a machine learning model, and the computer program in the present disclosure, the user can comfortably travel the human-powered vehicle with power consumption of the power supply device reduced.

MODE FOR CARRYING OUT INVENTION

The descriptions of the embodiments below are examples of forms that an output device, a method for generating a machine learning model, and a computer program according to the present disclosure can take, though there is no intention to limit the forms. The output device, the method for generating a machine learning model, and a computer program according to the present disclosure can take forms different from the embodiments, such as forms of modification of each of the embodiments, a combination of at least two or more embodiments that do not contradict each other, and a combination of at least two or more modifications that do not contradict each other.

First Embodiment

Figure 1:
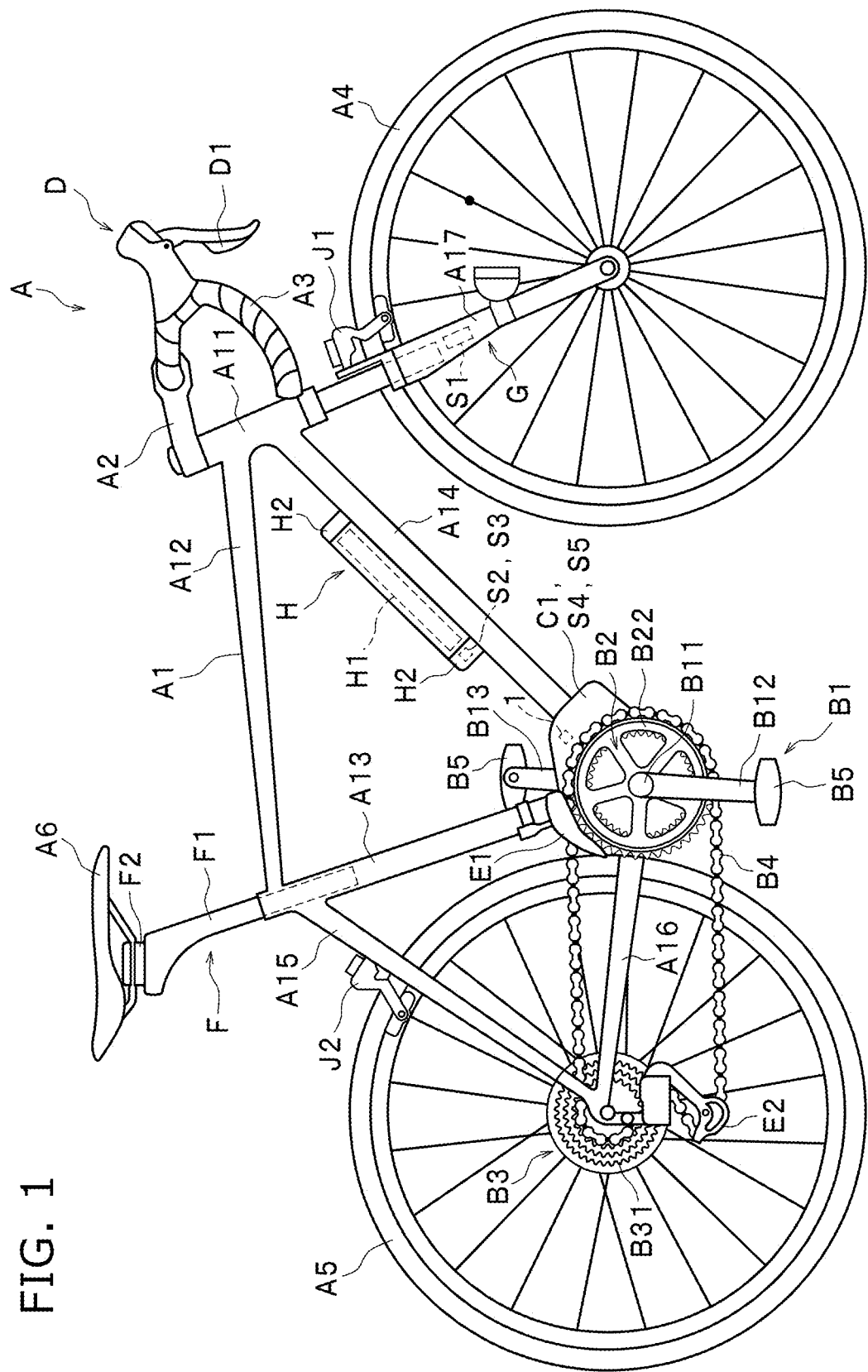
FIG. 1 is a side view of a human-powered vehicle to which an output device in the first embodiment is mounted.

FIG. 1 is a side view of a human-powered vehicle A to which an output device 1 according to the first embodiment is mounted. The human-powered vehicle A is a bicycle including an assist mechanism C that is configured to assist the propulsion of the human-powered vehicle A using electric energy. In the present embodiment, a road bicycle will be described as an example of a type of the bicycle. The configuration of the human-powered vehicle A can arbitrarily be changed. In the first example, the human-powered vehicle A need not include the assist mechanism C. In the second example, the type of the human-powered vehicle A is a city bicycle, a mountain bicycle, a recumbent bicycle, a cargo bicycle, or a hybrid bicycle. In the third example, the human-powered vehicle A may include only one wheel, or three or more wheels.

The human-powered vehicle A is provided with a frame A1, a stem A2, a handle bar A3, a front wheel A4, a rear wheel A5 and a saddle A6. The human-powered vehicle A includes a driving mechanism B, the assist mechanism C, an operating device D, a transmission E, a seat post F, a suspension G, a battery unit H, a brake device J, and an output device 1. The human-powered vehicle A includes a speed sensor S1, an acceleration sensor S2, an angle sensor S3, a cadence sensor S4 and a torque sensor S5. The output device 1 is preferably configured to output a signal related to controlling a component 13 of the human-powered vehicle A according to operation performed on the operating device D. The component 13 of the human-powered vehicle A includes at least one of the assist mechanism C, the transmission E, the seat post F, the suspension G, the battery unit H and the brake device J. The output device 1 is configured to output information related to controlling the component 13 of the human-powered vehicle A in accordance with the information acquired from the speed sensor S1, the acceleration sensor S2, the angle sensor S3, the cadence sensor S4, and the torque sensor S5.

In the present embodiment, the frame A1 is a diamond-shaped frame including a head tube A11, a top tube A12, a seat tube A13, a down tube A14, a seat stay A15, and a chain stay A16. A part of a front fork A17 is disposed inside the head tube A11 which is partially connected to the front fork A17. The stem A2 is disposed so as to be operatively connected with the front fork A17. The handle bar A3 is fixed to the stem A2. The front fork A17 includes the suspension G. The front wheel A4 is mounted to an end of the front fork A17. The rear wheel A5 is mounted to the portion where the seat stay A15 and the chain stay A16 are connected. The frame A1 may have a shape other than a diamond shape.

The driving mechanism B is configured to transmit a human-powered driving force to the rear wheel A5 by a chain, a belt, or a shaft. The human-powered vehicle A illustrated in FIG. 1 is provided with the driving mechanism B including a chain. The driving mechanism B includes a crank B1, a first sprocket assembly B2, a second sprocket assembly B3, a chain B4, and a pair of pedals B5.

The crank B1 includes a crank shaft B11, a first crank arm B12, and a second crank arm B13. The crank shaft B11 is rotatably supported to the housing of the assist mechanism C mounted to the connected portion between the seat tube A13 and the down tube 14, or to a bottom bracket. The first crank arm B12 and the second crank arm B13 are respectively connected to the axial ends of the crank shaft B11. One of the pair of pedals B5 is rotatably supported to the first crank arm B12. The other one of the pair of pedals B5 is rotatably supported to the second crank arm B13.

The first sprocket assembly B2 has a first rotational central axis, and is connected to the crank shaft B11 so as to enable unitary rotation. The first sprocket assembly B2 may directly be connected to the crank shaft B11, or may indirectly be connected thereto via another member. The first sprocket assembly B2 and the crank shaft B11 may be connected via a one-way clutch configured to transmit motive power to the first sprocket assembly B2 when the crank shaft B1 rotates forwardly. The first sprocket assembly B2 includes one or more sprockets B22. The crank shaft B11 and the first sprocket assembly B2 are coaxial with each other.

The second sprocket assembly B3 has a second rotation central axis, and is rotatably supported to a hub of the rear wheel A5. The second sprocket assembly B3 includes one or more sprockets B31. The hub of the rear wheel A5 includes a free wheel.

The chain B4 is entrained about any one of the sprockets B22 of the first sprocket assembly B2 and any one of the sprockets B31 of the second sprocket assembly B3. When the crank B1 rotates forwardly by a human-powered driving force applied to the pair of pedals B5, the first sprocket assembly B2 rotates forwardly together with the crank B1, which transmits the rotation of the first sprocket assembly B2 to the second sprocket assembly B3 via the chain B4, thereby rotating forwardly the rear wheel A5.

The assist mechanism C is configured to assist the propulsion of the human-powered vehicle A. As one example, the assist mechanism C is configured to be provided at the portion where the seat tube A13 and the down tube A14 are connected, and to assist the propulsion of the human-powered vehicle A by transmitting torque to the first sprocket assembly B2. The assist mechanism C includes an electric motor C1 driven by electric power supplied from the battery H1, for example. The assist mechanism C may include a reducer connected to an output shaft of the electric motor C1. The assist mechanism C may include a sprocket to be engaged with the chain B4 and is configured to directly drive the chain B4, not the first sprocket assembly B2. The assist mechanism C may be disposed on at least one of the front wheel A4 or the rear wheel A5. The assist mechanism C includes a hub motor, for example, if it is disposed on at least one of the front wheel A4 and the rear wheel A5. Any configuration may be taken as long as the assist mechanism C is configured to assist the propulsion of the human-powered vehicle A. The assist mechanism C is a drive unit.

The operating device D includes an operating unit D1 configured to be operated by the user. The operating unit D1 is configured to input operation information for operating control of a component. The operating unit D1 includes one or more buttons and electric switches respectively corresponding to the one or more buttons, for example. In accordance with the operating unit D1 being operated, the operating device D1 may be configured to receive predetermined operation related to control of at least any one of the assist mechanism C, the transmission E, the seat post F, the suspension G, and the brake device J.

The operating unit D1 may include a button for switching of the operating mode of the assist mechanism C. The operating mode for the assist mechanism C includes multiple modes being different from each other in at least one of an assist ratio and the upper limit of an assist force in at least a part of a speed range, for example. The multiple modes include, for example, a first mode in which the assist ratio is the smallest, a second mode in which the assist ratio is larger than that in the first mode, a third mode in which the assist ratio is the largest, and an automatic assist mode in which the assist ratio is automatically changed. In the automatic assist mode, the mode switching may automatically be made from the first mode to the third mode, or at least one of the assist ratio, and the upper limit of the assist force may automatically and continuously be switched.

The operating unit D1 may include a button for switching the operating mode for the transmission E. The operating mode for the transmission E includes a manual gear shift mode in which a gear stage is shifted in accordance with an instruction from the user and an automatic gear shift mode in which a gear stage is automatically shifted, for example. The operating unit D1 may include a button for switching the operating mode for the seat post F. The operating mode for the seat post F includes a manual mode in which the height of the seat post F is changed in accordance with an instruction from the user and an automatic mode in which the height of the seat post F is automatically changed, for example. The operating unit D1 may include a button for switching the operating mode for the suspension G. The operating mode for the suspension G includes a manual mode in which the state of the suspension G is changed in accordance with an instruction from the user and an automatic mode in which the state of the suspension G is automatically changed, for example. The operating unit D1 may include a button for switching the operating mode for the brake device J. The operating mode for the brake device J includes a manual mode in which the brake device J is applied in accordance with an instruction from the user and an automatic mode in which the brake device J is automatically applied, for example.

The operating unit D1 is disposed on at least one of the handle bar A3, the bracket of a brake lever and the brake lever, for example.

The button included in the operating unit D1 corresponds to the assist mechanism C, the transmission E, the seat post F, the suspension G, or the brake device J. In the present embodiment, for example, the operating unit D1 includes a first button and a second button corresponding to the assist mechanism C, a third button and a fourth button corresponding to the transmission E, a fifth button and a sixth button corresponding to the seat post F, a seventh button and an eighth button corresponding to the suspension G, and a ninth button and a tenth button corresponding to the brake device J.

The operating device D outputs an instruction for switching the operating mode for the assist mechanism C to a processing device 10 when the first button or the second button is operated, for example. If the first button is operated, for example, the operating device D inputs operation information for switching the operating mode for the assist mechanism C in such a manner as to increase the assist ratio. If the second button is operated, for example, the operating device D inputs operation information for switching the operating mode for the assist mechanism C in such a manner as to reduce the assist ratio.

The operating device D inputs operation information for shifting a gear stage or a gear ratio for the transmission E when the third button or the fourth button is operated, for example. If the third button is operated, for example, the operating device D inputs operation information for shifting the gear stage or the gear ratio for the transmission E in such a manner as to increase the gear ratio. If the fourth button is operated, for example, the operating device D inputs operation information for shifting the gear stage or the gear ratio for the transmission E in such a manner as to reduce the transmission ratio.

The operating device D inputs operation information for changing the height of the seat post F when the fifth button or the sixth button is operated, for example. If the fifth button is operated, for example, the operating device D inputs operation information for changing the height of the seat post F in such a manner as to raise the seat post. If the sixth button is operated, for example, the operating device D inputs operation information for changing the height of the seat post F in such a manner as to lower the seat post F.

The operating device D inputs operation information for changing the suspension G when the seventh button or the eighth button is operated, for example. If the seventh button is operated, for example, the operating device D inputs operation information for changing the state of the suspension G in such a manner as to increase the damping ratio or the hardness of the suspension G. If the eighth button is operated, for example, the operating device D inputs operation information for changing the state of the suspension G in such a manner as to reduce the damping ratio or the hardness of the suspension G.

The operating device D inputs operation information for changing the state of the brake device J when the ninth button or the tenth button is operated, for example. If the ninth button is operated, for example, the operating device D inputs operation information for changing the state of the brake device J in such a manner as to increase the braking force. If the tenth button is operated, for example, the operating device D inputs operation information for changing the state of the brake device J in such a manner as to reduce the braking force.

The operating device D further includes a sending unit configured to send operation information according to the operation performed on the operating unit D1. The sending unit of the operating device D preferably sends operation information according to the operation performed on the operating device D to the output device 1. The sending unit of the operating device D may be configured to directly send operation information according to the operation performed on the operating unit D1 to each of the components. In the first example, the sending unit of the operating device D is communicatively connected to the components through a communication line or an electric wire that allows for power line communication (PLC). In the second example, the sending unit of the operating device D includes a wireless communication unit that allows for wireless communication and is communicatively connected to the components by wireless communication. When acquiring operation information from the operating device D in accordance with the operation performed on the operating unit D1, the processing unit 10 of the output device 1 controls each of the components in accordance with the operation information.

The transmission E is configured to change the rotational speed of the wheel relative to the rotational speed of the crank. The transmission E can take various forms. In the first example, the transmission E includes an external transmission configured to shift a coupled state between the second sprocket assembly B3 and the chain B4 to thereby change a gear ratio. In the second example, the transmission E includes an external transmission configured to shift a coupled state between the first sprocket assembly B2 and the chain B4 to thereby change a gear ratio. In the third example, the transmission E includes the external transmission in the first example and the external transmission in the second example. In the fourth example, the transmission E includes an internal transmission. The internal transmission includes a stepped internal transmission using a planetary gear mechanism and a continuously variable internal transmission using a ball planetary. The internal transmission is provided in at least one of a power transmission path from the crank shaft B11 to the first sprocket assembly B2 and the hub of the rear wheel A5, for example. In the fifth example, the transmission E includes at least one of the external transmission in the first example and the external transmission in the second example as well as the internal transmission in the fourth example. The transmission E is controlled in response to a gear shift signal for shifting a gear stage or a gear ratio. An implementation in which the human-powered vehicle A is provided with the transmission E in the third example will be described below.

The transmission E includes a front derailleur E1 and a rear derailleur E2. The front derailleur E1 is mounted to the seat tube A13 of the frame A1, for example. The front derailleur E1 is provided with an electric motor E11 driven by the electric power supplied from the battery H1. The front derailleur E1 is further provided with a chain guide and a gear stage sensor. For the transmission E including the front derailleur E1, the first sprocket assembly B2 includes multiple sprockets B22. The electric motor E11 shifts the chain guide from a gear shift position corresponding to one of the multiple sprockets B22 to a gear shift position corresponding to another one of the multiple sprockets B22 to thereby change the sprocket B22 with which the chain B4 is engaged. The front derailleur E1 is configured to position the chain guide at any gear shift position via the electric motor E11 and the gear stage sensor in response to a gear shift instruction from the operating device D in accordance with the operation performed on the operating unit D1, or in accordance with a gear shift instruction from the output device 1.

The rear derailleur E2 is mounted to the portion where the chain stay A16 and the seat stay A15 are connected via a derailleur hanger. A hub shaft of the rear wheel A5 is supported to the portion where the chain stay A16 and the seat stay A15 are connected. The rear derailleur E2 is provided with a drive motor E21 driven by the electric power supplied from the battery H1. The rear derailleur E2 is further provided with a chain guide and a gear stage sensor. For the transmission E including the rear derailleur E2, the second sprocket assembly B3 includes multiple sprockets B31. The electric motor E21 shifts the chain guide from a gear shift position corresponding to one of the multiple sprockets B31 to a gear shift position corresponding to another one of the multiple sprockets B31, to thereby change the sprocket B31 with which the chain B4 is engaged. The rear derailleur E2 is configured to position the chain guide at any gear shift position via the electric motor E11 and the gear stage sensor in accordance with a gear shift instruction from the operating device D based on the operation performed on the operating unit D1, or a gear shift instruction from the output device 1.

The seat post F connects the saddle A6 to the frame A1. The seat post F includes a main post body F1 mounted to the seat tube A13 of the frame A1 and a saddle attachment portion F2 mounted to the main post body F1. The saddle A6 is disposed on the saddle attachment portion F2. The seat post F is an adjustable seat post configured to change the height of the saddle A6. The seat post F is provided with an electric actuator such as an electric motor or the like driven by the electric power supplied from the battery H1. The seat post F includes an electric seat post that allows the seat post F to extend or contract by the force of the electric actuator, or a mechanical seat post that allows the seat post F to extend by a force of at least one of a spring or air by operating of a valve by the force of the electric actuator and to contract by the force applied by the human. The mechanical seat post includes a hydraulic seat post or a hydraulic-pneumatic hybrid seat post. Since a well-known configuration can be employed for the seat post F, the details will not be described here. The seat post F is provided with a sensor configured to detect the height of the seat post F. Using the length of the seat post F when the saddle A6 is in the lowest position as a reference length, for example, the height of the seat post F is decided depending on the extension amount of the seat post F from the reference length. The larger the extension amount of the seat post F from the reference length is, the higher the seat post F is. The seat post F includes a linear encoder or a rotary encoder, for example. The electric actuator may include a reduction gear connected to the output shaft of the electric motor. The seat post F is configured to position the saddle A6 at any one of the multiple positions set in advance, for example, by the electric actuator in accordance with an instruction from the operating device D based on the operation performed on the operating unit D1 or an instruction from the output device 1.

The suspension G can take various forms. The suspension G includes a front suspension configured to be disposed at the front fork A17 that supports the front wheel A4, for example, and to damp the shock applied to the front wheel A4. The suspension G may include a rear suspension configured to be disposed at the frame A1, for example, and to damp the shock applied to the rear wheel A5. In some embodiments, the suspension G may include a front suspension and a rear suspension. The suspension G may include a seat suspension that is configured to be provided in the seat post F and to damp the shock applied to the saddle A6. The suspension G is provided with an electric actuator such as an electric motor or the like driven by the electric power supplied from the battery H1. For at least one of a channel allowing the oil to move through the suspension G or a channel allowing the air to move through the suspension G, the electric actuator of the suspension G changes the cross-section of the channels or switches the channels to thereby open or shut each of the channels. The electric actuator of the suspension G may be an electromagnetic valve. The suspension G is configured to change at least one of a stroke length, a locked out state and a damping rate, for example, by the electric actuator in accordance with an instruction from the operating device D based on the operation performed on the operating unit D1 or an instruction from the output device 1. The suspension G is provided with a sensor configured to output a signal corresponding to the state of the suspension G. The sensor of the suspension G includes a rotary encoder for detecting the state of rotation of an electric motor connected to the valve, for example.

The brake J may take various forms. The brake device J includes a front brake device J1 configured to brake the front wheel and a rear brake device J2 configured to brake the rear wheel. The front brake device J1 and the rear brake device J2 each include a caliper brake device, a disk brake device, or the like. The front brake device J1 and the rear brake device J2 each include an electric actuator such as an electric motor or the like driven by the electric power supplied from the battery H1. The front brake device J1 and the rear brake device J2 are configured to change the braking force in accordance with an instruction from the operating device D based on the operation performed on the operating unit D1 or an instruction from the output device 1.

The battery unit H includes a battery H1 and a battery holder H2. The battery H1 includes one or more battery cells. The battery H1 is preferably configured to be rechargeable. The battery G1 corresponds to a power supply device. The battery holder H2 may be fixed at the down tube A14 of the human-powered vehicle A, for example. The battery holder H2 may be fixed at the components of the frame A1 other than the down tube A14 or at another member to be mounted to the frame A1. The member to be mounted to the frame A1 includes, for example, a handle bar, a wheel, a component, or the like. The battery H1 is configured to be mounted to and detached from the battery holder H2. The battery holder H2 is connected to the assist mechanism C, the transmission E, the seat post F, the suspension G, and the output device 1 through electrical cables. While mounted to the battery holder H2, the battery H1 is configured to be electrically connected to the electric motor of the assist mechanism C, the electric motor of the transmission E, the electric motor of the seat post F, the electric motor of the suspension G, and the output device 1. The battery holder H2 may be omitted.

The speed sensor S1 is disposed on the front fork A17, for example. The speed sensor S1 is configured to output a signal corresponding to a travel speed of the human-powered vehicle A. The speed sensor S1 includes a magnetic sensor configured to detect one or more magnets provided in the front wheel A4, for example. The one or more magnets is provided in, for example, the spoke of the front wheel A4, the hub of the front wheel A4, the disk brake of the front wheel A4, or the like. The speed sensor S1 is configured to output a preset signal when detecting a magnet, for example. The speed sensor S1 is configured to output a signal corresponding to a rotational speed of the front wheel A4 to the output device 1. The speed sensor S1 may be disposed on the chain stay A16, for example. In such a case, the speed sensor S1 is configured to output a signal corresponding to a rotational speed of the rear wheel A5, not the front wheel A4. The speed sensor S1 and the output device 1 may be connected through an electrical cable, or may be connected via a wireless transmission device or a wireless communication device.

The acceleration sensor S2 is disposed on the frame A1, for example. In the first example, the acceleration sensor S2 is disposed at the battery holder H2. In the second example, the acceleration sensor S2 is disposed at the seat tube A13. In the third example, the acceleration sensor S2 is disposed at the assist mechanism C or the output device 1. The acceleration sensor S2 is configured to output at least one of a signal corresponding to vibrations of the frame A1 and a signal corresponding to the acceleration in the direction of progress of the human-powered vehicle A to the output device 1. The acceleration sensor S2 may be mounted to the front fork A17. The acceleration sensor S2 and the output device 1 may be connected through an electrical cable, or may be connected via a wireless transmission device or a wireless communication device.

The angle sensor S3 is disposed on the frame A1, for example. In the first example, the angle sensor S3 is disposed at the battery holder H2. In the second example, the angle sensor S3 is disposed at the seat tube A13. In the third example, the angle sensor S3 is disposed at the assist mechanism C or the output device 1. In the fourth example, the angle sensor S3 is provided so as to be shared between the frame A1 and the stem A2, handle bar A3, or front fork A17. The angle sensor S3 is configured to output at least one of a signal indicating a yaw angle, a signal indicating a roll angle, and a signal indicating a pitch angle of the human-powered vehicle A to the output device 1. The angle sensor S3 includes a gyro sensor in the first example. The angle sensor S3 includes a bearing sensor that outputs a signal corresponding to a rotational angle in the second example. The angle sensor S3 and the output device 1 may be connected through an electrical cable, or may be connected via a wireless transmission device or a wireless communication device.

The cadence sensor S4 is configured to output a signal corresponding to a cadence of the crank B1. The cadence sensor S4 outputs a signal corresponding to a rotational speed of the crank B1. The cadence sensor S4 is configured to detect the crank B1 or a member to be detected provided in a member that is integrally rotated with the crank B1. The cadence sensor S4 may be configured to output a signal in response to one rotation of the crank B1, may be configured to output multiple signals during one rotation of the crank B1 and may be configured to output a signal that continuously varies during one rotation of the crank B1. The cadence sensor S4 includes a magnetic sensor in the first example. If the cadence sensor S4 includes a magnetic sensor, the object to be detected includes a magnet. The magnet may include multiple magnets that are disposed to be spaced in the direction of rotation and includes a ring magnet the magnetic force of which continuously varies in the direction of rotation or a ring magnet the magnetic poles of which are alternately arranged in the direction of rotation. The cadence sensor S4 includes an optical sensor in the second example. If the cadence sensor S4 includes an optical sensor, a member to be detected includes a slit. The member to be detected may include only one slit, or may include multiple slits arranged in the direction of rotation. The cadence sensor S4 and the output device 1 may be connected through an electrical cable, or may be connected via a wireless transmission device or a wireless communication device.

The torque sensor S5 is configured to output signals corresponding to torques applied to the first crank arm B12 and the second crank arm B13. The torque sensor S5 includes a strain sensor, a magnetostrictive sensor, a pressure sensor, or the like. The strain sensor includes at least one of a metal strain gauge and a semiconductor strain gauge. The torque sensor S5 is provided in a power transmission path from the pedal B5 to the rear wheel A5 or provided near the member included in the power transmission path. The member included in the power transmission path is, for example, the crank shaft B11, a member that transmits human-powered driving force between the crank shaft B11 and the first sprocket assembly B2, the crank arm B12, or the pedal B5. The torque sensor S5 outputs signals corresponding to the torques of the human-powered driving forces inputted to the first crank arm B12 and the second crank arm B13 to the output device 1. The torque sensor S5 and the output device 1 may be connected through an electrical cable, or may be connected via a wireless transmission device or a wireless communication device.

The output device 1 is mounted to a member disposed on the frame A1 such as the stem A2, the handle bar A3, or the like, and is mounted to any position of the frame A1. The output device 1 may be carried by the user. In the first example, the output device illustrated in FIG. 1 is provided in the assist mechanism C. The output device 1 is provided in the assist mechanism C, for example, and may be provided in the housing provided with an electric motor. In the second example, the output device 1 is provided in the battery holder H2. In the third example, the output device 1 may be provided in a junction to which electrical cables are connected for connecting multiple components.

Figure 2:
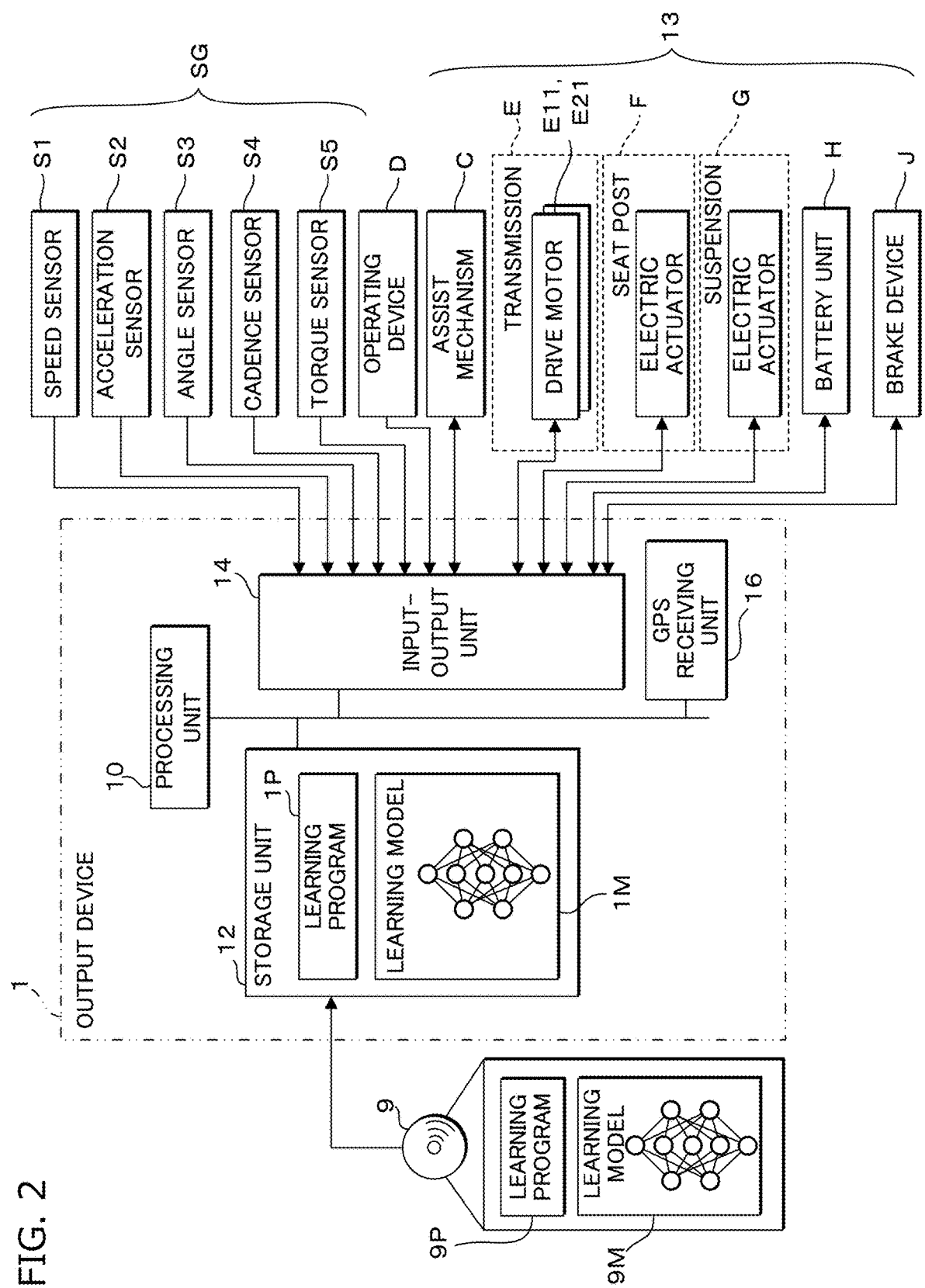
FIG. 2 is a block diagram illustrating the configuration of the human-powered vehicle including the output device in the first embodiment and a recording medium.

As illustrated in FIG. 2, the output device 1 includes a processing unit 10, a storage unit 12, an input-output unit 14 and a GPS receiving unit 16. The GPS receiving unit 16 is not indispensable.

The processing unit 10 is provided with processing circuitry, e.g., a processor including at least one of a central processing unit (CPU), a graphics processing unit (GPU), a tensor processing unit (TPU), an application specific integrated circuit (ASIC), a field programmable gate array (FPGA), a system-on-chip (SOC). a system-on-module (SOM), or other suitable processing circuitry. The processing unit 10 includes a memory such as a read only memory (ROM), a random access memory (RAM) and so on. The processing unit 10 is configured to use the memory included in the processing unit 10 to control components of the human-powered vehicle A while training a machine learning model 1M according to a learning algorithm, which will be described below. The memory included in the processing unit 10 stores a control program used for controlling the components. The control program may be stored in the storage unit 12. The processing unit 10 further includes an internal clock. The processing unit 10 is configured to use the internal clock to thereby acquire information related to a time at any timing.

The storage unit 12 includes a non-volatile memory such as a flash memory, for example. The storage unit 12 stores a computer program. The computer program stored in the storage unit 12 includes a learning program 1P. The learning program 1P may be incorporated into the control program used for controlling components. The control program may be stored in the storage unit 12. The storage unit 12 is electrically connected to the processing unit 10 via a bus, for example. The storage unit 12 is configured to store the machine learning model 1M generated by the processing performed by the processing unit 10. The learning program 1P and the machine learning model 1M may be copies of a learning program 9P and a machine learning model 9M stored in a computer-readable storage medium, such as a recording medium 9. For example, the processing unit 10 may read out the learning program 9P and the machine learning model 9M from the recording medium 9, and respectively copy the learning program 9P and the machine learning model 9M as the learning program 1P and the machine learning model 1M in the storage unit 12. For example, an external device may read out the learning program 9P and the machine learning model 9M from the recording medium 9, and respectively copy the learning program 9P and the machine learning model 9M as the learning program 1P and the machine learning model 1M in the storage unit 12. The recording medium 9 includes, for example, a disk-shaped recording medium such as a CD-ROM, a nonvolatile semiconductor memory such as a flash memory, a hard disk, or the like.

The output device 1 may include at least one of a connection port that can be connected to the recording medium 9, a first communication unit that can be connected to an electronic apparatus capable of reading out the data stored in the recording medium 9 through a communication cable or by a wireless communication device, and a second communication unit that can acquire data stored in the recording medium 9 through communication networks such as the Internet or the like.

The input-output unit 14 is configured to receive signals transmitted from the operating device D mounted to the human-powered vehicle A and a sensor group SG. The input-output unit 14 is electrically connected to the processing unit 10. The sensor group SG includes the speed sensor S1, the acceleration sensor S2, the angle sensor S3, the cadence sensor S4, and the torque sensor S5. The input-output unit 14 is connected to the operating device D, the speed sensor S1, the acceleration sensor S2, the angle sensor S3, the cadence sensor S4, and the torque sensor S5 through communication cables. The communication cable includes an electrical cable or an optical fiber.

The input-output unit 14 is configured to communicate with a component 13. The component 13 includes the assist mechanism C, the transmission E, the seat post F, the suspension G, and the brake device J. The input-output unit 14 is connected to the assist mechanism C, the transmission E, the seat post F, the suspension G, and the battery unit H through communication cables. The input-output unit 14 is connected to the electric motor C1 included in the assist mechanism C. The input-output unit 14 is connected to at least one of the electric motor E11 and the electric motor E21 included in the transmission E. The input-output unit 14 is connected to the electric actuator of the seat post F. The input-output unit 14 is connected to the electric actuator of the suspension G. The input-output unit 14 is connected to the electric actuator of the brake device J. The input-output unit 14 is configured to communicate with the battery H. The input-output unit 14 is connected to the battery H through a communication cable.

The assist mechanism C may be provided with an assist control unit that is configured to be connected to the electric motor E21 to control the electric motor E21. The transmission E may be provided with a transmission control unit that is configured to be connected to the electric motor E11 and the electric motor E21 to control the electric motor E11 and the electric motor E21. The seat post F may be provided with a seat post control unit that is configured to be connected to the electric actuator included in the seat post F to control the electric actuator included in the seat post F. The suspension G may be provided with a suspension control unit that is configured to be connected to the electric actuator included in the suspension G to control the electric actuator included in the suspension G. The assist control unit, the transmission control unit, the seat post control unit, and the suspension control unit each include processing circuitry, e.g. a processor including a CPU, for example.

The input-output unit 14 may include a wireless communication device. The wireless communication device of the input-output unit 14 may be configured to receive a signal transmitted from at least one of the operating device D, the speed sensor S1, the acceleration sensor S2, the angle sensor S3, the cadence sensor S4 and the torque sensor S5 by wireless communication. The wireless communication device of the input-output unit 14 may be configured to wirelessly communicate with at least one of the assist mechanism C, the transmission E, the seat post F, the suspension G, and the battery unit H. The wireless communication device of the input-output unit 14 may be configured to communicate using a wireless communication protocol set in advance, for example. The wireless communication protocol set in advance may be configured to be compatible with a short range wireless communication standard such as Bluetooth (registered trademark), for example.

The GPS receiving unit 16 is configured to receive a global positioning system (GPS) signal to output information related to a position of the human-powered vehicle A. The GPS receiving unit 16 is electrically connected to the processing unit 10. The processing unit 10 is configured to identify the position of the human-powered vehicle A in accordance with the information outputted from the GPS receiving unit 16. The position of the human-powered vehicle A includes longitude and latitude, for example.

The processing unit 10 acquires a signal corresponding to a travel speed of the human-powered vehicle A from the speed sensor S1 via the input-output unit 14. The processing unit 10 acquires at least one of a signal corresponding to vibrations of the frame A1 and a signal corresponding to acceleration in the direction of progress of the human-powered vehicle A from the acceleration sensor S2 via the input-output unit 14. The processing unit 10 acquires a signal indicating an attitude of the human-powered vehicle A from the angle sensor S3 via the input-output unit 14. The signal indicating the attitude of the human-powered vehicle A includes at least one of a signal indicating a yaw angle, a signal indicating a roll angle, and a signal indicating a pitch angle of the human-powered vehicle A. The processing unit 10 acquires a signal corresponding to a cadence from the cadence sensor S4 via the input-output unit 14. The processing unit 10 acquires a signal corresponding to a torque from the torque sensor S5 via the input-output unit 14. The processing unit 10 may calculate power using the cadence and the torque. The processing unit 10 can acquire information related to at least one of the amount of current in the electric motor C1, a voltage value of the electric motor C1 and a temperature of the electric motor C1. The processing unit 10 uses the memory to store information indicating the association between the amount of current in the electric motor C1 and the torque of the electric motor C1, for example. The processing unit 10 is configured to acquire the information related to the torque of the electric motor C1 for the assist mechanism C based on the amount of current in the electric motor C1. The processing unit 10 can acquire information corresponding to a gear stage or a gear ratio from the transmission E via the input-output unit 14. The processing unit 10 can acquire information corresponding to the amount of remaining power from the battery H1 via the input-output unit 14.

The processing unit 10 uses information on a travel speed or the like corresponding to the signal acquired from the sensor group SG and information acquired from the component group 13 as input information to execute processing. The processing unit 10 acquires information sent from the operating device D by the input-output unit 14. The input-output unit 14 need not be communicatively connected to the electric actuator that is not an object to be controlled by the output device 1.

The processing unit 10 is configured to output a control signal to a component such as the assist mechanism C or the like in accordance with the output information related to controlling the component that is outputted from the machine learning model 1M.

The machine learning model 1M used in the first embodiment will be described. The machine learning model 1M stored in the storage unit 12 in the initial state is generated by executing in advance a simulation of the model of the human-powered vehicle A under a traveling test environment of the human-powered vehicle A in an external generation device, for example. The machine learning model 1M is configured to output information related to at least one of an assist ratio and the upper limit of an assist force for the assist mechanism C when information related to traveling is inputted. The machine learning model 1M may be configured to output the number of rotations of the electric motor C1 of the assist mechanism C in place of or in addition to the information related to at least one of an assist ratio and the upper limit of an assist force. In the first embodiment, the machine learning model 1M is generated by reinforcement learning using a neural network (hereinafter referred to as NN). The machine learning model 1M stored in the storage unit 12 in the initial state may be generated by collecting in advance travel data of the human-powered vehicles A having high electric power consumption efficiency of the battery H1 as training data and using the training data for supervised learning, though not limited to be generated by simulation.

Figure 3:
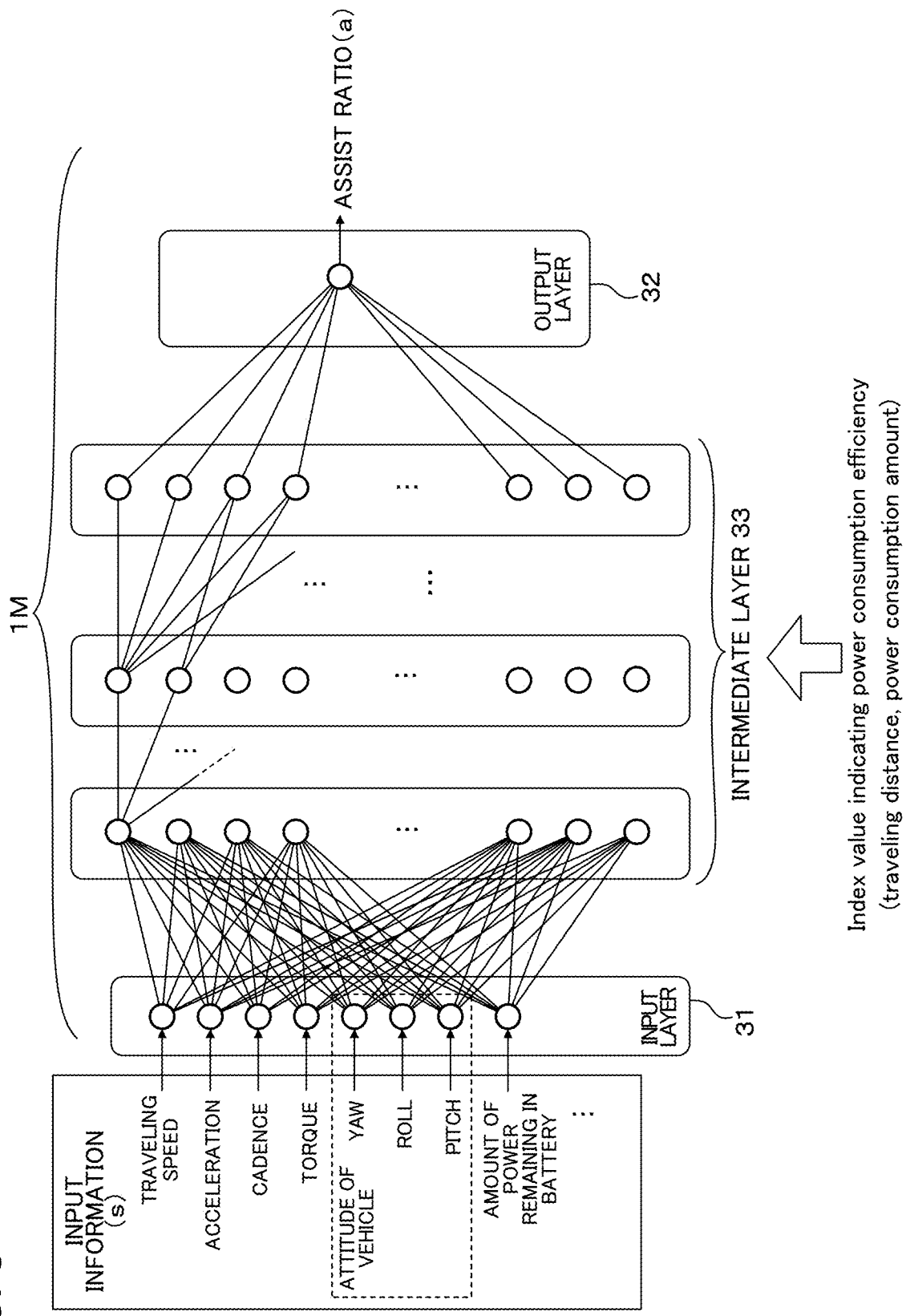
FIG. 3 illustrates the outline of a machine learning model.

FIG. 3 illustrates the outline of the machine learning model 1M. When input information is inputted, the machine learning model 1M is configured to be trained in accordance with an index value indicating the electric power consumption efficiency in the battery H1 that supplies power to a component of the human-powered vehicle A and to output information related to controlling the component of the human-powered vehicle A. In the first embodiment, the component of the human-powered vehicle A is the assist mechanism C. In the first embodiment, the machine learning model 1M is configured to output information related to an assist ratio as output information related to controlling the assist mechanism C. The processing unit 10 executes the processing defined by the machine learning model 1M to thereby regard output information outputted by the processing unit 10 as output information outputted by the machine learning model 1M.

As illustrated in FIG. 3, the machine learning model 1M in the first embodiment includes an input layer 31 for inputting input information related to traveling acquired while the human-powered vehicle A is traveling as a state s and an output layer 32 for outputting information on an assist ratio related to controlling the assist mechanism C among the components of the human-powered vehicle A as an action a. The machine learning model 1M includes an intermediate layer 33 having parameters that are trained so as to improve the electric power consumption efficiency in the battery H1 when the assist mechanism C is automatically controlled in accordance with the assist ratio outputted from the output layer 32. The parameters in the intermediate layer 33 include weights. The parameters in the intermediate layer 33 may further include biases. The intermediate layer 33 includes multiple nodes. The intermediate layer 33 preferably includes multiple layers.

The input information to be inputted to the input layer 31 of the machine learning model 1M in the first embodiment includes at least one of the information related to a cadence of the crank B1, the information related to a torque of the crank B1 and the information related to power, for example. Preferably, the input information to be inputted to the input layer 31 of the machine learning model 1M includes at least one of a speed, acceleration, and an attitude of the human-powered vehicle A, for example. The power can be acquired by calculation using the information related to a cadence and the information related to a torque. The input information may include information related to at least one of a torque of the electric motor C1, the amount of current in the electric motor C1, a voltage value of the electric motor C1 and a temperature of the electric motor C1 for the assist mechanism C.

The input information to be inputted to the input layer 31 of the machine learning model 1M in the first embodiment includes information related to the amount of electric power remaining in the battery H1. The input information may be information related to the amount of electric power outputted from the battery H1.

The input information to be inputted to the input layer 31 of the machine learning model 1M in the first embodiment includes detection data related to an attitude of the human-powered vehicle A. The detection data related to an attitude of the human-powered vehicle A includes information corresponding to at least one of a yaw angle, a roll angle, and a pitch angle detected by the angle sensor S3. Preferably, the detection data related to an attitude of the body of the human-powered vehicle A includes information corresponding to the yaw angle, information corresponding to the roll angle, and information corresponding to the pitch angle that are detected by the angle sensor S3.

The input information to be inputted to the input layer 31 of the machine learning model 1M in the first embodiment may include detection data related to a traveling environment of the human-powered vehicle A. The detection data related to a traveling environment includes information related to an altitude, for example. The processing unit 10 may be configured to identify the information related to an altitude in accordance with the position identified by the GPS receiving unit 16 and the map data stored in the storage unit 12, for example. The output device 1 may be configured to further include an atmospheric pressure sensor and to acquire the information related to an altitude from the atmospheric pressure. The detection data related to a traveling environment may include information related to an atmospheric temperature. The output device 1 may be configured to further include an atmospheric temperature sensor and to acquire the information related to an atmospheric temperature from the atmospheric temperature sensor. The detection data related to a traveling environment may include information related to an inclination of the road for the human-powered vehicle A. The information related to an inclination of the road for the human-powered vehicle A may be acquired from information indicating a pitch angle of the human-powered vehicle A obtained from the angle sensor S3. The detection data related to a traveling environment may include information related to a type of a road for the human-powered vehicle A. The type of a road includes on-road information and off-road information, for example. The processing unit 10 may be configured to identify the type of the road in accordance with the position identified by the GPS receiving unit 18 and the map data stored in the storage unit 12, for example. The detection data related to a traveling environment may include information related to the weather. The information related to the weather includes information related to humidity, for example. The output device 1 may be configured to include a humidity sensor, for example, and to acquire the information related to the weather from the humidity sensor.

The output information outputted from the output layer of the machine learning model 1M in the first embodiment is information related to at least one of an assist ratio for the assist mechanism C and the upper limit of an assist force by the assist mechanism C.

The intermediate layer 33 is trained by reinforcement learning so as to output information related to an assist ratio for improving the electric power consumption efficiency in accordance with an index value indicating the electric power consumption efficiency in the battery H1 from the output layer 32. In the first embodiment, the intermediate layer 33 is so trained as to allow the load on the user of the human-powered vehicle A to fall within a range of comfort when the electric motor C1 is driven in accordance with the information related to an assist ratio outputted from the output layer 32.

In the first embodiment, the processing unit 10 is configured to train the machine learning model M1 by reinforcement learning while using the index value as a reward. The processing unit 10 performs approximation on the machine learning model 1M shown in FIG. 3 by a value function Q taking an action a in a state s, and advances training so as to maximize the value function Q regarding an index value indicating the electric power consumption efficiency in the battery H1 as a reward.

Figure 4:
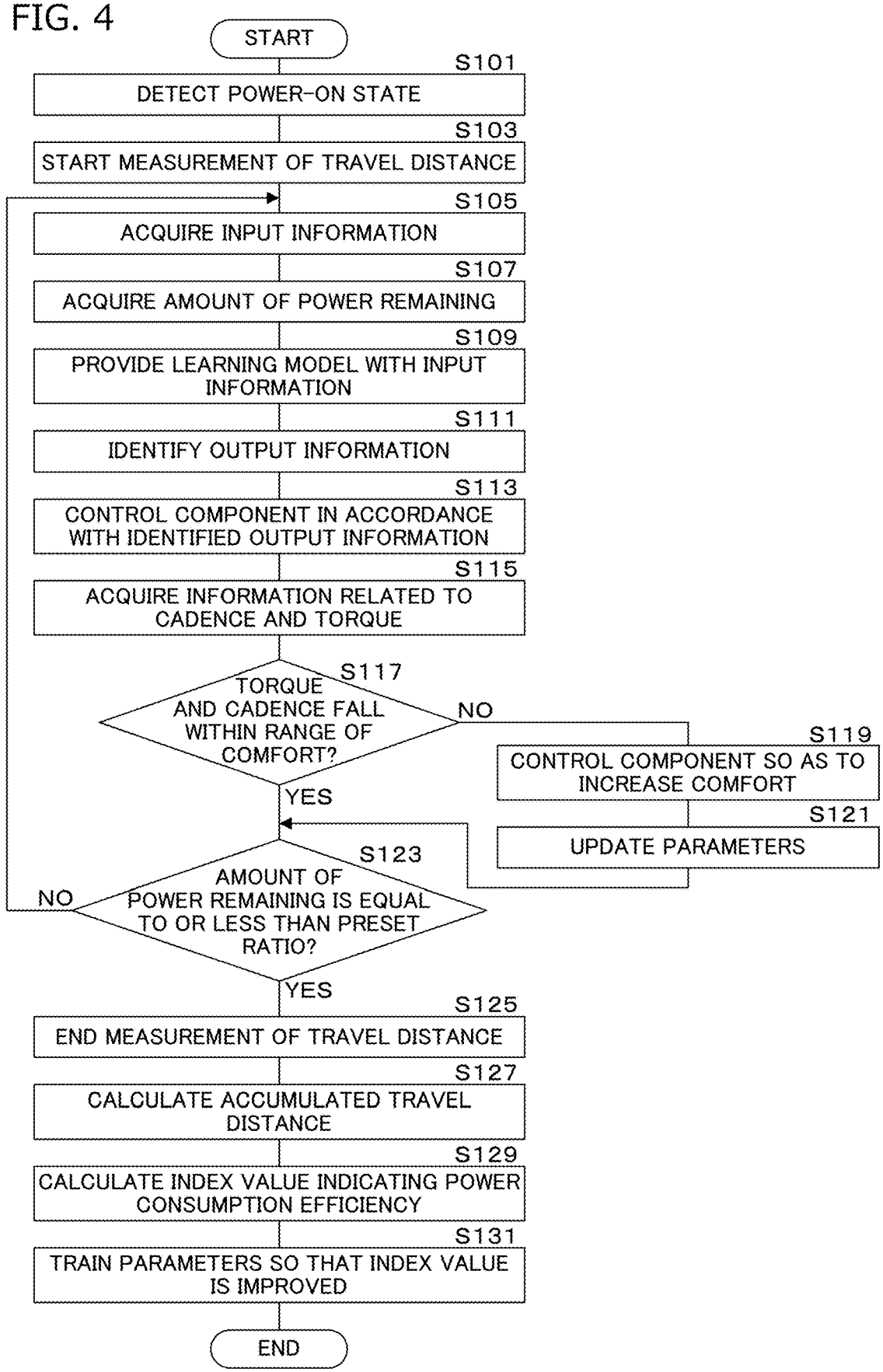
FIG. 4 is a flowchart showing one example of a method for generating the machine learning model in the first embodiment.

FIG. 4 is a flowchart showing one example of a method for generating the machine learning model 1M in the first embodiment. The processing unit 10 uses the machine learning model 1M stored in the storage unit 12 in the initial state to execute the processing for controlling the assist mechanism C in accordance with the learning program 1P to advance the training. By advancing the training, the processing unit 10 can generate the machine learning model 1M for assisting the traveling of the human-powered vehicle A by the assist mechanism C as long as possible while the comfortability of the user is maintained.

When a power-on state of the output device 1 is detected in the state where the battery H1 is fully charged (step S101), the processing unit 10 starts measurement of the travel distance (step S103). The power-on state means that electric power is supplied from the battery H1 to the processing unit 10. The processing unit 10 executes the processing from steps S105 to S123 while electric power is supplied to the assist mechanism C in the power-on state until the amount of electric power remaining in the battery H1 is equal to or less than a preset ratio.

After measurement of the travel distance is started at step S103, the processing unit 10 acquires input information related to traveling of the human-powered vehicle A at a preset sampling timing (step S105). The input information includes, for example, information related to the travel speed corresponding to a signal acquired from the speed sensor S1, information related to the acceleration corresponding to a signal acquired from the acceleration sensor S2, information related to the attitude of the human-powered vehicle A corresponding to a signal acquired from the angle sensor S3, information related to the cadence of the crank B1, information related to the torque of the crank B1, and information related to the power.

After the input information related to traveling of the human-powered vehicle A is acquired at step S105, the processing unit 10 acquires the amount of electric power remaining in the battery H1 (step S107).

After the amount of electric power remaining in the battery H1 is acquired at step S107, the processing unit 10 provides the machine learning model 1M with the input information acquired at step S105 and S107 (step S109), and identifies the output information outputted from the machine learning model 1M (step S111). In the present embodiment, the output information outputted from the machine learning model 1M is information related to an assist ratio. After the output information outputted from the machine learning model 1M is identified, the processing unit 10 controls the component in accordance with the identified output information (step S113). In the present embodiment, the processing unit 10 outputs a control signal in accordance with the information related to the identified assist ratio to the assist mechanism C at step S113.

After the component is controlled at step S113, the processing unit 10 acquires the information related to the cadence and torque in the human-powered vehicle A (step S115). After the information related to the cadence and torque are acquired at step S115, the processing unit 10 determines whether or not the acquired information related to the torque and cadence falls within a range of comfort (step S117).

If it is determined that the torque and cadence do not fall within a range of comfort (S117: NO), the processing unit 10 controls the component so as to further increase the comfort than that obtained when the control at step S113 is performed (step S119). In the present embodiment, the processing unit 10 outputs a control signal to the assist mechanism C in such a manner as to increase the assist ratio at step S119.

After the component is controlled at step S119, the processing unit 10 updates the parameters in the machine learning model 1M in accordance with the output information identified at step S111 and the information related to the control at step S119 (step S121). At step S121, the processing unit 10 updates the parameters in the machine learning model 1M in accordance with the difference between the assist ratio indicated by the information related to the assist ratio identified at step S111 and the assist ratio indicated by the information related to the increased assist ratio. Thus, the parameters in the machine learning model 1M are updated so as to increase the comfortability of the user. By the processing at steps S117, S119, and S121, the machine learning model 1M is trained so as to output information that allows the comfortability of the user to fall within a preset range when the component of the human-powered vehicle A that is traveling is controlled in accordance with the outputted information. The processing at step S121 is not indispensable. For example, when a first mode is selected in the mode for the assist mechanism C, the burden by the human-powered driving force is allowed to be out of the range of comfort, and thus processing at steps S117, S119, and S121 may be omitted.

If it is determined that the torque and the cadence fall within the range of comfort (S117: YES), the processing unit 10 determines whether or not the amount of electric power remaining in the battery H1 acquired at step S107 is equal to or less than a preset ratio with respect to the full charge (step S123). If it is determined that the amount of electric power remaining in the battery H1 is not equal to or less than a preset ratio with respect to the full charge (NO at step S123), the processing unit 10 returns the processing to step S105 to continue controlling the component in accordance with the machine learning model 1M.

If it is determined that the amount of electric power remaining in the battery H1 is equal to or less than a preset ratio with respect to the full charge (YES at step S123), the processing unit 10 ends the measurement of the travel distance (step S125). After completion of the measurement of the travel distance at step S125, the processing unit 10 calculates a travel distance accumulated from the time when the battery H1 is fully charged (step S127). The processing unit 10 is configured to calculate the travel distance based on a signal acquired from the speed sensor S1 and the information related to the perimeter of a wheel, for example. The information related to the perimeter of a wheel is stored in the memory of the processing unit 10 or the storage unit 12, for example. The number of preset signals to be outputted from the speed sensor S1 during one rotation of a wheel is determined in advance, and thus the processing unit 10 can calculate the travel distance in accordance with the preset signals outputted from the speed sensor S1. The processing unit 10 may calculate the travel distance in accordance with the position identified by the GPS receiving unit 18, for example.

At step S129, the processing unit 10 calculates an index value indicating the electric power consumption efficiency based on the accumulated travel distance calculated at step S127. The index value is a value related to the travel distance until the electric power in the power supply device is equal to or less than a preset value, for example. The index value is calculated such that the longer the travel distance is, the higher the evaluation is, while the shorter the travel distance is, the lower the evaluation is. The length of the travel distance is determined by the comparison between a travel distance actually traveled and a setting value for the distance that can be traveled while the assist mechanism C is set to the automatic mode, and an assist-capable state by the assist mechanism C is maintained in the case where the battery H1 is fully charged, for example.

After calculation of the index value at step S129, the processing unit 10 trains the parameters such as weights or the like in the intermediate layer 33 for the machine learning model 1M so that the index value calculated at step S123 is improved (step S131) and ends the processing.

In the first embodiment, the machine learning model 1M is trained by reinforcement learning so as to improve the electric power consumption efficiency by being provided with a reward depending on the travel distance according to the flowchart shown in FIG. 4. The output device 1 properly controls the component in accordance with the output information outputted from the machine learning model 1M that has been trained by reinforcement learning.

The machine learning model 1M may be trained by a known method, such as a backpropagation, deep learning, or the like. The reinforcement learning may be performed by a known method, such as a deep Q learning, actor critic (AC), asynchronous advantage actor-critic, or the like. The machine learning model 1M may be trained by reinforcement learning by providing the outputted information with an immediate reward depending on a comfort evaluation by the user for the cadence and torque. The processing unit 10 may be configured to be trained by using as a reward a value indicating comfortability based on the user's evaluation for the cadence and the torque in the crank B12 of the human-powered vehicle during traveling. The index value may be a value based on an electric power consumption amount in the power supply device, for example. The machine learning model 1M may be trained by reinforcement learning by being provided with a reward by a value based on the electric power consumption amount during a preset period for every preset period until the battery H1 reaches a preset ratio or lower from the full charge. The power consumption amount is an amount of electric power outputted from the power supply device.

The learning method for the machine learning model 1M by the output device 1 in the human-powered vehicle A during traveling may be a supervised learning algorithm or a recurrent neural network using time series data. In such a case, the history of the travel information corresponding to signals acquired during traveling at multiple time points from the sensor group SG of the human-powered vehicle A when the human-powered vehicle A having the assist mechanism C is actually traveling and the travel distances are collected as training data, and the learning is advanced in accordance with the collected training data.

Figure 5:
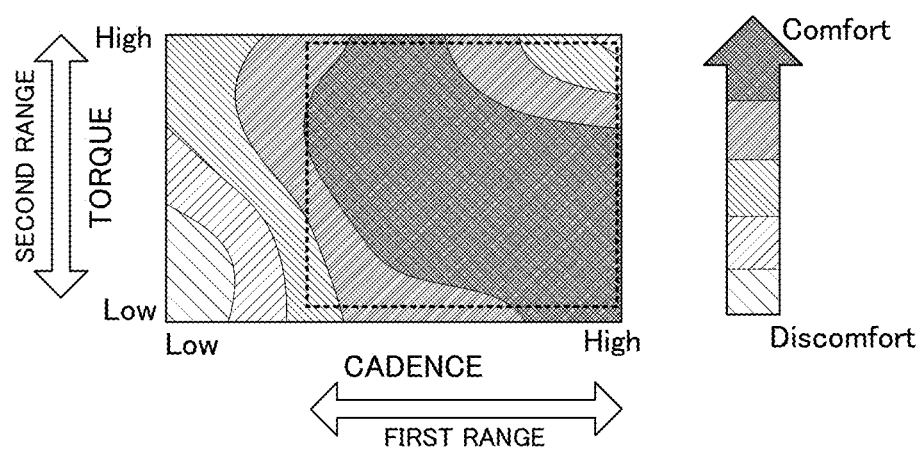
FIG. 5 is a schematic view illustrating one example of a range of comfort for a cadence and a torque.

The range of comfort at step S117 in the processing shown in the flowchart in FIG. 4 includes a range of the combination between the cadence and the torque that is acquired in advance by sensory evaluation. FIG. 5 is a schematic view illustrating one example of a range of comfort for the cadence and the torque. The sensory evaluation for a set of the cadence and the torque as illustrated in FIG. 5 shows that comfort is mostly determined if the cadence is in a first range and the torque is in a second range, for example.

The output device 1 in the present embodiment can control the component so that the electric power consumption efficiency is improved depending on the way of riding of the human-powered vehicle A as the learning progresses, and allows the user to comfortably travel the human-powered vehicle A for a long time.

In the first embodiment, the machine learning model 1M is designed to output information related to an assist ratio for the assist mechanism C as information related to controlling a component and is designed to learn the information of the assist ratio for the assist mechanism C. The machine learning model 1M may be designed to output information related to the upper limit of an assist force for the assist mechanism C as information related to controlling a component, and may be designed to learn the information related to the upper limit of the assist force for the assist mechanism C. The machine learning model 1M may be designed to output information related to the number of rotations for the electric motor driven by the electric power supplied from the power supply device, and may be designed to learn the information related to the number of rotations for the electric motor. The machine learning model 1M may be designed to output information related to the number of rotations of the electric motor for the seat post F driven by the electric power supplied from the battery H1, for example, and may be designed to learn the information related to the number of rotations of the electric motor for the seat post F. The machine learning model 1M may be designed to output information related to the number of rotations of the electric motor for the suspension G driven by the electric power supplied from the battery H1, for example, and may be designed to learn the information related to the number of rotations of the electric motor for the suspension G.

The machine learning model 1M in the first embodiment may be configured to output information related to controlling another component. The component 13 to be controlled using the output information may be any one of the transmission E, the seat post F, the suspension G, and brake device J, not limited to the assist mechanism C. The component 13 to be controlled using the output information may be at least two of the transmission E, the assist mechanism C, the seat post F, the suspension G, and the brake device J. The component 13 not to be controlled using the output information among the components such as the transmission E, the assist mechanism C, the seat post F, the suspension G, the brake device J, and the like does not necessarily include the electric motor or the electric actuator, and may be controlled through a wire.

Second Embodiment

An output device in the second embodiment is adapted to a communication device 2 other than the control device configured to control each of the components mounted to the human-powered vehicle A. In the second embodiment, the communication device 2 carried by the user is configured to generate and train a machine learning model 2M, and to send information related to controlling a component to a control device. The control device is configured to receive the information related to controlling a component in accordance with the machine learning model 2M sent from the communication device 2 and to control the component.

Figure 6:
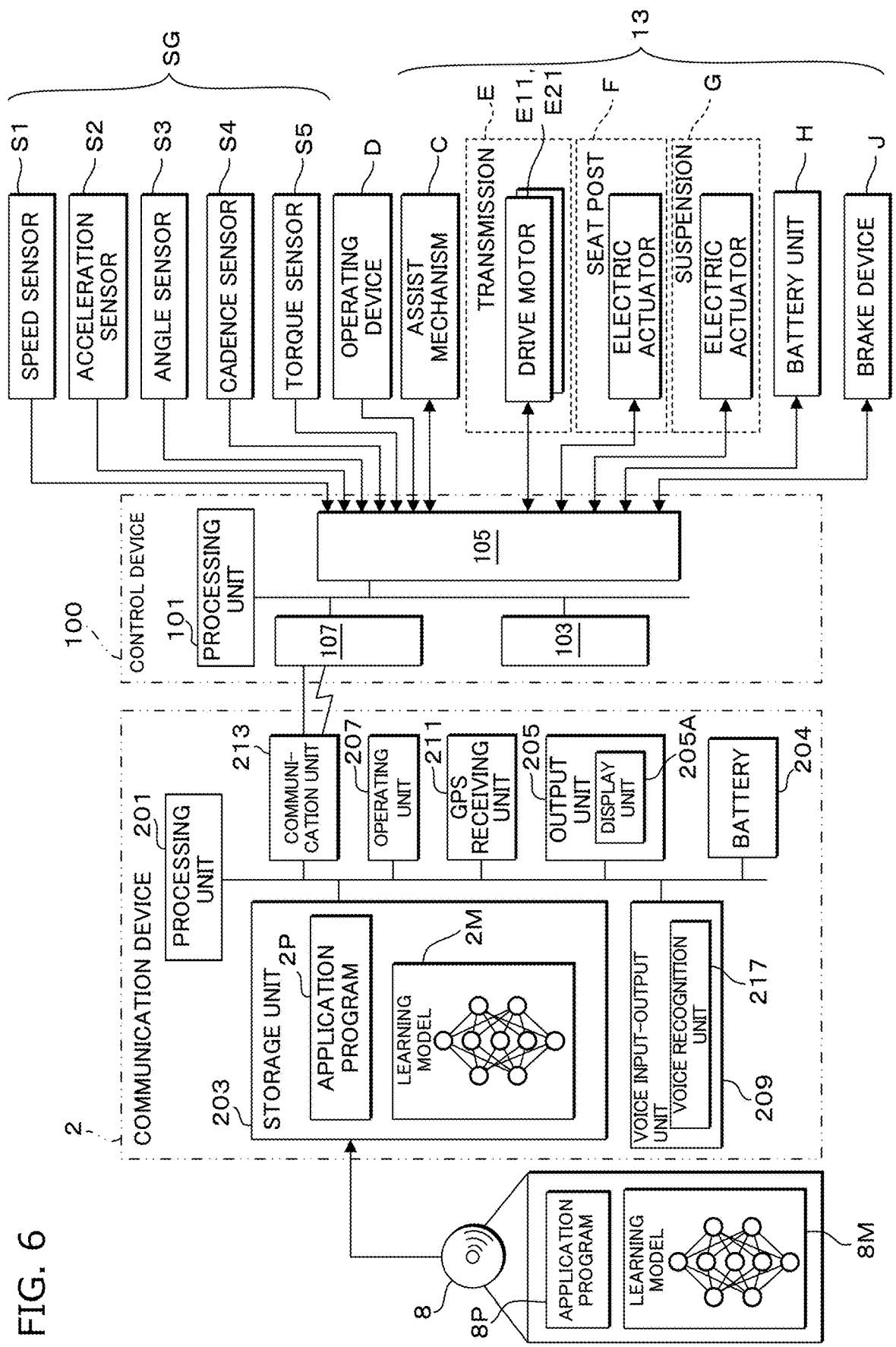
FIG. 6 is a block diagram illustrating the configuration of a human-powered vehicle including a communication device functioning as an output device in the second embodiment and a recording medium.

As illustrated in FIG. 6, the human-powered vehicle A in the second embodiment, a component group 13 mounted to the human-powered vehicle A and a sensor group SG are similar to those in the first embodiment. In the second embodiment, the components similar to those in the first embodiment are denoted by similar reference codes, and detailed description thereof will not be repeated. In the second embodiment, in place of the output device 1 in the first embodiment, a control device 100 and a communication device 2 work cooperatively to control a component in accordance with the machine learning model 2M.

The control device 100 includes a processing unit 101, a storage unit 103, an input-output unit 105 and a communication unit 107.

The processing unit 101 is provided with processing circuitry, e.g. a processor including at least one of a CPU and a GPU. The processing unit 101 includes a memory such as a ROM, a RAM, and the like, for example. The processing unit 101 is configured to control a component of the human-powered vehicle A. The memory included in the processing unit 101 stores a control program used for controlling a component. The control program may be stored in the storage unit 103. The processing unit 101 further includes an internal clock. The processing unit 101 is configured to use the internal clock to acquire information related to time at an arbitrary timing. The processing unit 101 is configured to output a signal related to controlling a component of the human-powered vehicle A in accordance with operation performed on the operating device D. The processing unit 101 is configured to control a component of the human-powered vehicle A in response to a signal related to controlling the component of the human-powered vehicle A received from the communication device 2 via the communication unit 107.

The storage unit 103 includes a non-volatile memory such as a flash memory, for example. The storage unit 103 stores information created by the processing performed by the processing unit 101. The control program may be stored in the storage unit 203. The storage unit 103 is electrically connected to the processing unit 101 through a bus, for example. The input-output unit 105 is similar in configuration to the input-output unit 14 in the first embodiment.

The communication unit 107 is a communication device configured to be able to communicate with the communication device 2. The communication unit 107 includes at least one of a universal serial bus (USB) communication port and a short range wireless module, for example.

The communication device 2 is a portable and compact communication device. In the first example, the communication device 2 is a cycle computer. In the second example, the communication device 2 may be a so-called junction box that is connected to the components of the human-powered vehicle A through electrical cables or a wireless communication device. In the third example, the communication device 2 is a smartphone. In the fourth example, the communication device 2 is a wearable device such as a so-called smartwatch or the like. In the fifth example, the communication device 2 is a cellular phone. If the communication device 2 is a cycle computer or a smartphone, for example, a smartphone holding member may be mounted to the handlebar A3 of the human-powered vehicle A, and the communication device 2 may be used while being put on the holding member (see FIG. 10).

The communication device (output device) 2 includes a processing unit 201, a storage unit 203, an output unit 205, an operating unit 207, a voice input-output unit 209, a GPS receiving unit 211, and a communication unit 213. The communication device 2 further includes a battery 204. The battery 204 is configured to supply electric power to the processing unit 201, the storage unit 203, the output unit 205, the operating unit 207, the voice input-output unit 209, the GPS receiving unit 211, and the communication unit 213. The communication device 2 preferably includes a power switch allowing for switching between a power-on state and a power-off state. The battery 204 is configured to supply electric power to at least the processing unit 201 in the power-on state.

The processing unit 201 includes processing circuitry, e.g. a processor including at least one of a CPU and a GPU, and a memory and so on. The processing unit 201 may be constituted as a single hardware (SoC: system on a chip) integrated with the processor, the memory, the storage unit 203 and the communication unit 213. The processing unit 201 executes training of the machine learning model 2M related to controlling the human-powered vehicle A and component control using the machine learning model 2M in accordance with a computer program stored in the storage unit 203. The computer program stored in the storage unit 203 includes an application program 2P.

The storage unit 203 includes a non-volatile memory such as a flash memory, for example. The storage unit 203 stores the application program 2P incorporating a learning program. The storage unit 203 stores the machine learning model 2M to be trained by the processing performed by the processing unit 201. The storage unit 203 stores data to be referred by the processing unit 201. The application program 2P may be a copy of an application program 8P stored in a computer-readable storage medium, such as a recording medium 8. For example, the processing unit 201 may read out a learning program incorporated in the application program 8P and a machine learning model 8M from the recording medium 8, and copy the learning program 8P and the machine learning model 8M as the learning program 2P and the machine learning model 2M in the storage unit 203. The recording medium 8 includes, for example, a disk-shaped recording medium such as a CD-ROM, a nonvolatile semiconductor memory such as a flash memory or a hard disk, or the like. The communication device 2 may connect the communication unit 213 to an electronic apparatus capable of reading out the data stored in the recording medium 8 through a communication cable or a wireless communication device, thereby acquiring the data stored in the recording medium 8. The communication device 2 may include at least one of a communication port that can be connected to the recording medium 8 and a second communication unit that can acquire the data stored in the recording medium 8 via the communication network such as the Internet or the like.

The output unit 205 includes a display unit 205A. The display unit 205A includes a display device such as a liquid crystal panel, an organic electroluminescence (EL) panel, or the like. The display unit 205A is configured to output the information related to controlling a component of the human-powered vehicle that is outputted from the machine learning model 2M. The display unit 205A is configured to output the information indicating the result of control of a component.

The operating unit 207 is an interface for receiving operation by the user, and includes at least one of a physical button and a touch panel device. The operating unit 207 may be provided so as to be superimposed on the display unit 205. The operating unit 207 can receive operation related to the details on the screen that is being displayed on the display unit 205 by the physical button or the touch panel.

The voice input-output unit 209 includes a speaker, a microphone and the like. The voice input-output unit 209 is provided with a voice recognition unit 217. The voice recognition unit 217 recognizes the details of operation corresponding to a voice signal inputted via the microphone, thereby receiving operation. The voice input-output unit 209 may be configured to generate voice or beep sound from the speaker, thereby outputting information related to control of a component and information indicating the result of component control. The output unit 205 may include a vibration generation device. The vibration generation device includes an electric motor and a weight, for example. The vibration generation device may be configured to generate vibrations of a specific pattern and vibrate the surface of the display unit 205A.

The GPS receiving unit 211 is configured to receive a GPS signal. The GPS receiving unit 211 is configured to output information related to a position of the communication device 2. The processing unit 201 is configured to identify the position of the communication device 2 in accordance with the information outputted from the GPS receiving unit 211. The position of the communication device 2 includes longitude and latitude, for example. The GPS receiving unit 211 may be configured to receive, for example, a radio wave from a base station of a public wireless communication system, or a radio wave from a relay station of a wireless communication system compatible with the wireless communication standard such as wireless LAN, Bluetooth (registered trademark) or the like. When calculating the information related to the position of the communication device 2, the processing unit 201 may use information related to the strength of a radio wave transmitted from the base station of the public communication system or of a radio wave transmitted from the relay station of the wireless communication system that are received by the GPS receiving unit 211.

The communication unit 213 is configured to be able to communicate with the communication unit 107 of the control device 100. The communication unit 213 includes at least one of a USB communication port and a short range wireless communication module, for example. In the case where the communication unit 213 includes the USB communication port, the communication device 2 may be supplied with electric power from the battery H1 via the communication unit 213.

In the second embodiment, the control device 100 acquires input information corresponding to a signal inputted via the input-output unit 105 from the sensor group SG mounted to the human-powered vehicle A and transmits the input information to the communication device 2 via the communication unit 107. The control device 100 may intermittently acquire input information and intermittently transmit input information to the communication device 2.

In the second embodiment, the processing unit 201 of the communication device 2 is configured to output information related to a gear stage or a gear ratio for the transmission E using the machine learning model 2M stored in the storage unit 12 in the initial state, for example and to update the machine learning model 2M. The machine learning model 2M stored in the storage unit 12 in the initial state is generated by executing in advance a simulation of the model of the human-powered vehicle A under a traveling test environment of the human-powered vehicle A in an external generation device as described in the first embodiment. The machine learning model 2M is configured to output information related to a gear stage or a gear ratio for the transmission E when information related to traveling is inputted.

Figure 7:
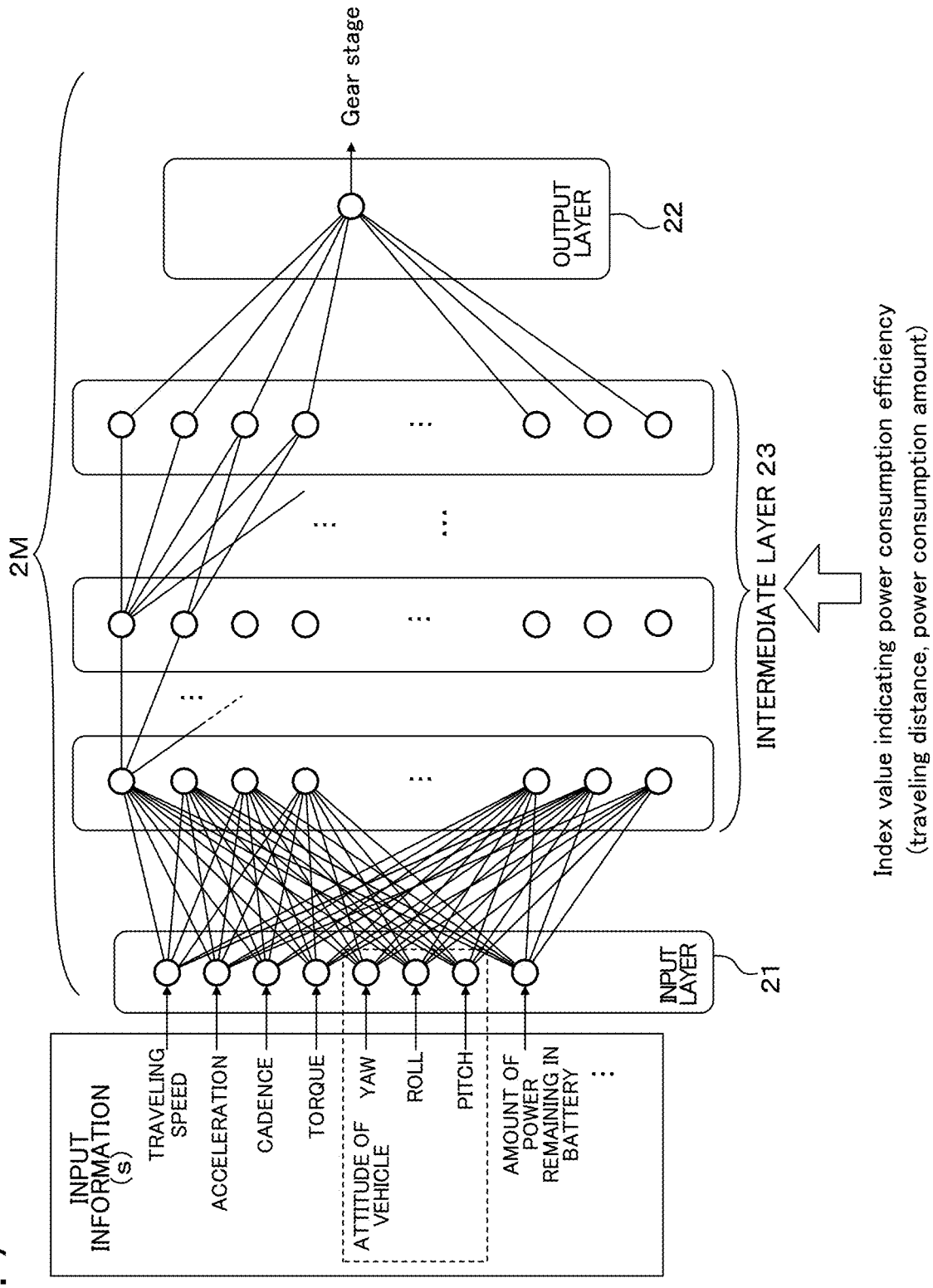
FIG. 7 illustrates the outline of a machine learning model.

FIG. 7 illustrates the outline of the machine learning model 2M. When input information is inputted, the machine learning model 2M is configured to be trained in accordance with an index value indicating electric power consumption efficiency in the battery H1 supplying electric power to a component of the human-powered vehicle A and to output information related to controlling the component of the human-powered vehicle A. In the second embodiment, the component of the human-powered vehicle A is the transmission E. In the second embodiment, the machine learning model 2M is configured to output information related to a gear stage as output information related to controlling the transmission E. The processing unit 201 executes the processing defined by the machine learning model 2M, thereby regarding the output information outputted by the processing unit 201 as output information outputted by the machine learning model 2M.

As illustrated in FIG. 7, the machine learning model 2M in the second embodiment includes an input layer 21 for inputting input information related to traveling acquired while the human-powered vehicle A is traveling as a state s and an output layer 22 for outputting information on a gear stage related to controlling the transmission E among the components of the human-powered vehicle A as an action a. The machine learning model 2M includes an intermediate layer 23 having parameters that are trained so that the electric power consumption efficiency of the battery H1 is improved when the transmission E is automatically shifted in accordance with the gear stage outputted from the output layer 22. The parameters in the intermediate layer 23 include weights. The parameters included in the intermediate layer 23 may further include biases. The intermediate layer 23 includes multiple nodes. The intermediate layer 23 preferably includes multiple layers.

The input information to be inputted to the input layer 21 of the machine learning model 2M in the second embodiment includes at least one of the information related to a cadence of the crank B1, the information related to a torque of the crank B1 and the information related to power, for example. Preferably, the input information to be inputted to the input layer 21 of the machine learning model 2M further includes at least one of a speed, acceleration, and an attitude of the human-powered vehicle A, for example. The power is acquired by calculation using the information related to the cadence and the information related to the torque.

The input information to be inputted to the input layer 21 of the machine learning model 2M in the second embodiment may include at least one of a torque of at least one of the electric motor E11 and the electric motor E21 for the transmission E, the amount of current in at least one of the electric motor E11 and the electric motor E21 for the transmission E, a voltage value of at least one of the electric motor E11 and the electric motor E21 for the transmission E, and a temperature of at least one of the electric motor E11 and the electric motor E21 for the transmission E. The input information may include information related to a present gear stage for the transmission E and information related to a time period during which the transmission E is maintained at one gear stage.

The input information to be inputted to the input layer 21 of the machine learning model 2M in the second embodiment includes information related to the amount of electric power remaining in the battery H1. The input information may be information related to the amount of electric power consumed in the battery H1.

The input information to be inputted to the input layer 21 of the learning model 2M in the second embodiment includes detection data related to an attitude of the human-powered vehicle A. The detection data related to an attitude of the human-powered vehicle A in the present embodiment is similar to that in the first embodiment.

The input information to be inputted to the input layer 21 of the machine learning model 2M in the second embodiment may include detection data related to a traveling environment of the human-powered vehicle A. The detection data related to a traveling environment includes information related to an altitude, for example. The processing unit 201 may be configured to identify the information related to an altitude in accordance with the position identified by the GPS receiving unit 211 and the map data stored in the storage unit 203, for example. The communication device 2 may further include an atmospheric pressure sensor, and the atmospheric pressure sensor may acquire the information related to an altitude. The detection data related to a traveling environment may include information related to an atmospheric temperature. The communication device 2 may be configured to further include an atmospheric temperature sensor and acquire the information related to an atmospheric temperature from the atmospheric temperature sensor. The detection data related to a traveling environment may include information related to an inclination of the road for the human-powered vehicle A. The information related to an inclination of the road for the human-powered vehicle A may be acquired from the information indicating a pitch angle of the human-powered vehicle A obtained from the angle sensor S3. The detection data related to a traveling environment may include information related to a type of the road for the human-powered vehicle A. The type of the road includes on-road information and off-road information, for example. The processing unit 201 may be configured to identify the type of the road based on the position identified by the GPS receiving unit 211 and the map data stored in the storage unit 203, for example. The detection data related to a traveling environment may include information related to the weather. The information related to the weather includes information related to humidity, for example. The communication device 2 may be configured to further include a humidity sensor, for example, and to acquire the information related to the weather from the humidity sensor.

The output information outputted from the output layer of the machine learning model 2M in the second embodiment includes information related to at least one of a gear stage or a gear ratio for the transmission E.

The intermediate layer 23 is trained by reinforcement learning so as to output information related to a gear stage for improving the electric power consumption efficiency in accordance with an index value indicating the electric power consumption efficiency in the battery H1 from the output layer 22. In the second embodiment, the intermediate layer 23 is so trained as to cause the load on the user of the human-powered vehicle A to fall within a range of comfort when the transmission E is automatically shifted in accordance with the information related to the gear stage outputted from the output layer 22.

In the second embodiment, the processing unit 201 of the communication device 2 is configured to use an index value as a reward to thereby train the machine learning model 2M by reinforcement learning. The processing unit 201 performs approximation on the machine learning model 2M shown in FIG. 7 by a value function Q taking an action a in a state s, and advances training such that the value function Q is maximized regarding an index value indicating the electric power consumption efficiency in the battery H1 as a reward.

Figure 8:
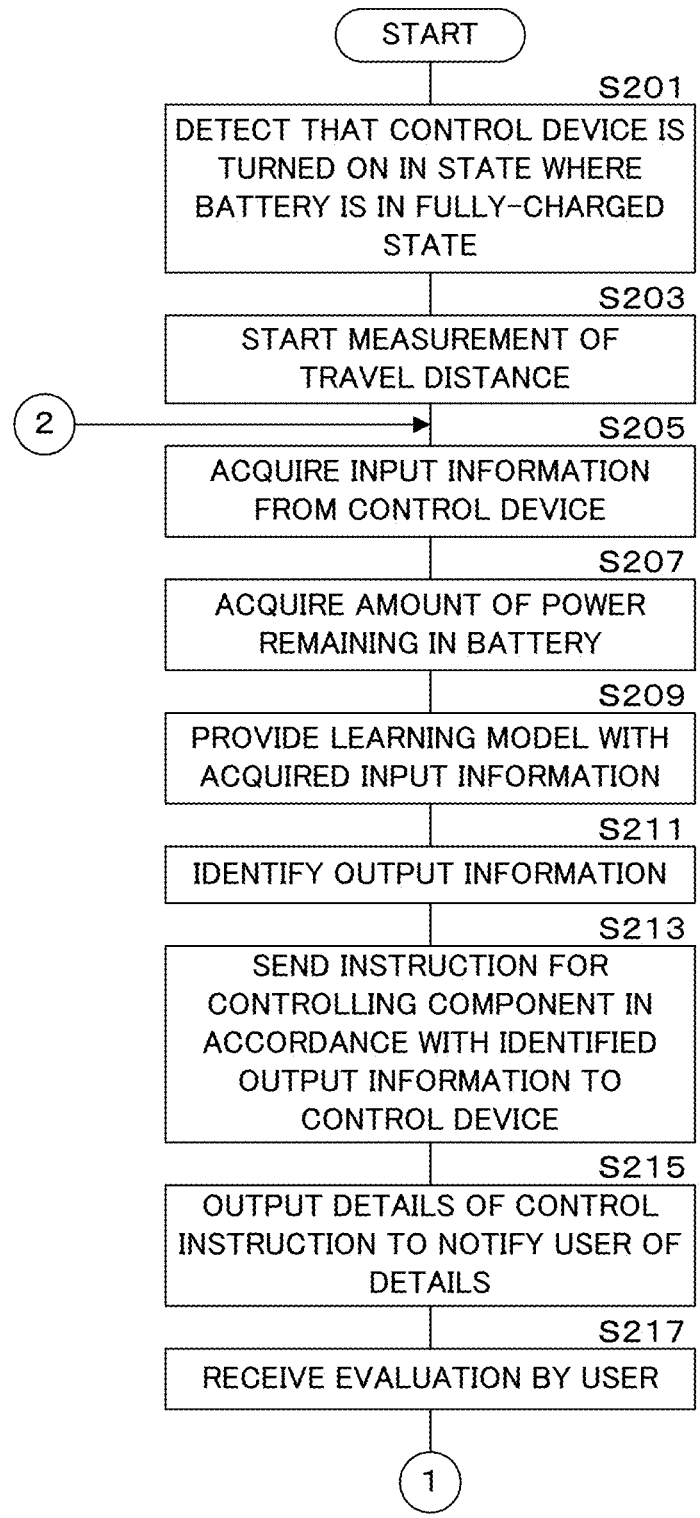
FIG. 8 is a flowchart showing one example of a method for generating the machine learning model in the second embodiment.
Figure 9:
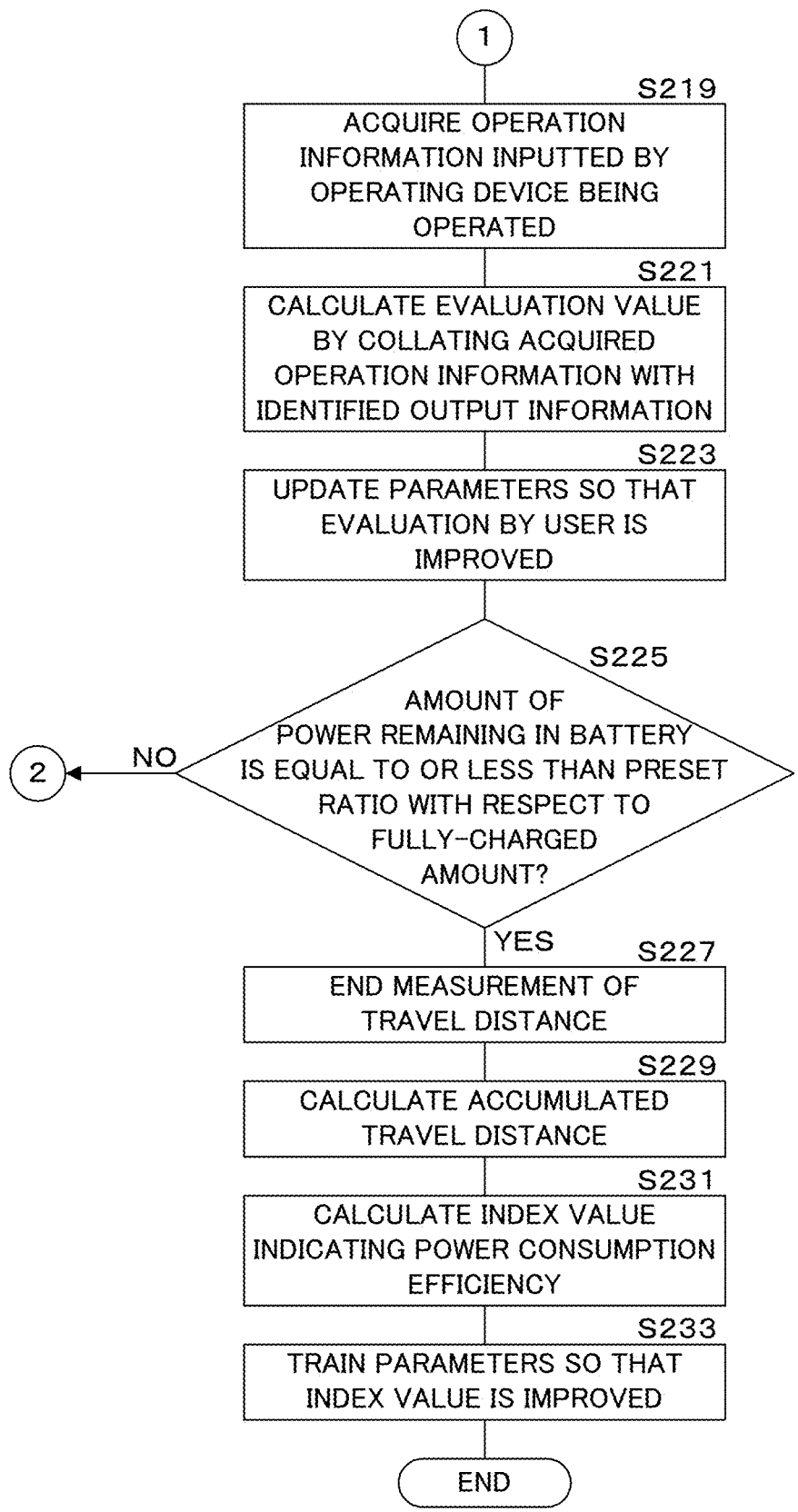
FIG. 9 is a flowchart showing one example of the method for generating the machine learning model in the second embodiment.

FIG. 8 and FIG. 9 are flowcharts showing one example of a method for generating the machine learning model 2M in the second embodiment. The processing unit 201 of the communication device 2 uses the machine learning model 2M stored in the storage unit 203 in the initial state to advance training while sending a signal for controlling the transmission E to the control device 100 in accordance with the learning program incorporated in the application program 2P. By the training, the processing unit 201 can generate the machine learning model 2M for outputting information related to a gear ratio that allows the transmission E to shift gear as long as possible while the comfortability of the user is maintained.

When the communication device 2 is turned on, and the processing unit 201 detects that the control device 100 is turned on in a state where the battery H1 is in a fully-charged state (step S201), the processing unit 201 starts measurement of the travel distance (step S203). The power-on state of the control device 100 means a state where electric power is supplied from the battery H1 to the processing unit 101. The processing unit 201 executes processing from steps S205 to S225 until the amount of electric power remaining in the battery H1 is equal to or less than a preset ratio while electric power is supplied to the transmission E in the power-on state of the communication device 2 and the control device 100.

After measurement of the travel distance is started at step S203, the processing unit 201 acquires input information related to traveling of the human-powered vehicle A at a preset sampling timing from the control device 100 via the communication unit 213 (step S205). The input information includes, for example, information related to a travel speed acquired from the speed sensor S1, information related to acceleration acquired from the acceleration sensor S2, information related to an attitude of the human-powered vehicle A acquired from the angle sensor S3, information related to a cadence of the crank B1, information related to a torque of the crank B1 and information related to the power. After the input information related to traveling of the human-powered vehicle A is acquired at step S205, the processing unit 201 acquires the amount of electric power remaining in the battery H1 (step S207).

After the amount of electric power remaining in the battery H1 is acquired at step S207, the processing unit 201 provides the machine learning model 2M with the input information acquired at step S205 and S207 (step S209) and identifies output information outputted from the machine learning model 2M (step S211). In the present embodiment, the output information outputted from the machine learning model 2M is information related to a gear stage for the transmission E.

After the output information outputted from the machine learning model 2M is identified, the processing unit 201 sends an instruction for controlling the component in accordance with the output information identified at step S211 from the communication unit 213 to the control device 100 (step S213). After the control instruction is sent from the communication unit 213, the processing unit 201 outputs the details of the control corresponding to the control instruction to the output unit 205 to thereby notify the user of the details (step S215). At step S215, the processing unit 201 displays the details of the control corresponding to the gear stage on the display unit 205A.

Figure 11:
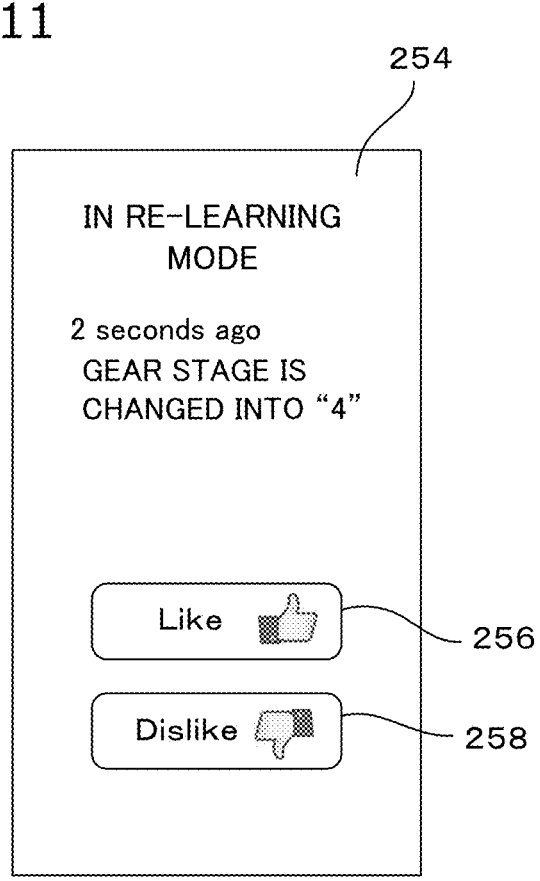
FIG. 11 illustrates one example of a screen to be displayed on a display unit according to an application program.

The control unit 201 receives an evaluation by the user within a preset time period from when the details of the control are outputted to the output unit 205 (step S217). At step S217, the processing unit 201 may receive an evaluation by the user within a preset time from when the control instruction is sent from the communication unit 213 to the control device 100. At step S217, the processing unit 201 displays an evaluation input screen 254 including a high evaluation button image 256 and a low evaluation button image 258 on the display unit 205A as illustrated in FIG. 11 to receive an evaluation by the operating unit 207. If there is no change on the details of the control, processing from steps S213 to S217 may be omitted.

After completion of the processing at step S217, or after completion of the processing at step S211 if the processing from steps S213 to S217 are omitted, the processing unit 201 acquires operation information inputted by the operating unit D1 of the operating device D being operated from the control device 100 via the communication unit 213 (step S219). In the present embodiment, at step S219, the processing unit 201 acquires a gear stage for the transmission E after the gear shift in accordance with the operation performed on the operating unit D1.

After the operation information is acquired at step S219, the processing unit 201 collates the operation information acquired at step S219 with the output information identified at step S211, thereby calculating an evaluation value (step S221). At step S221, the processing unit 201 calculates an evaluation value by collating the gear stage acquired at step S219 with the information related to the gear stage outputted at step S211, thereby calculating an evaluation value. At step 221, the processing unit 201 calculates a higher evaluation value as the difference between the gear stage acquired at step S219 and the gear stage identified at step S211 is less.

After the evaluation value is calculated at step S221, the processing unit 201 uses the details of the evaluation received at step S217 and the evaluation value calculated at step S221 as a reward for the output information identified at step S211 to update the parameters in the intermediate layer 23 of the machine learning model 2M so that the evaluation by the user is improved (step S223).

The processing at steps S221 and S223 may be performed only when the details of the evaluation received at step S217 represent a low evaluation. In this case, if the details of the evaluation received at step S217 represent a high evaluation, the processing at steps S221 and S223 is omitted.

After the processing at step S223 is completed, or after the processing at step S219 is completed if the processing at steps S221 and S223 is omitted, the processing unit 201 determines whether or not the amount of electric power remaining in the battery H1 acquired at step S207 is equal to or less than a preset ratio with respect to the fully-charged amount (step S225). If it is determined that the amount of electric power remaining in the battery H1 is not equal to or less than a preset ratio (NO at step S225), the processing unit 201 returns the processing to step S205 to continue to control the transmission E in accordance with the machine learning model 2M.

If it is determined that the amount of electric power remaining in the battery H1 acquired at step S207 is equal to or less than a preset ratio (YES at step S225), the processing unit 201 ends the measurement of the travel distance (step S227). After measurement of the travel distance is completed, the processing unit 201 calculates a travel distance accumulated from the time when the battery H1 is fully charged (step S229). At step S229, the processing unit 201 may calculate the travel distance in accordance with the position identified by the GPS receiving unit 18. The processing unit 201 may be configured to calculate the travel distance in accordance with a signal acquired from the speed sensor S1 and information related to the perimeter of a wheel. The information related to the perimeter of a wheel is stored in the memory of the processing unit 201, the storage unit 103 or the storage unit 203, for example.

The processing unit 201 calculates an index value indicating the electric power consumption efficiency in accordance with the travel distance calculated at step S229 (step S231). The index value is calculated such that the longer the travel distance is, the higher the evaluation is, while the shorter the travel distance is, the lower the evaluation is. The length of the travel distance is determined by the comparison between a travel distance actually traveled and a setting value for the distance that can be traveled while the transmission is set to the automatic gear shift mode, and the gear shift capable state by the transmission E is maintained in the case where the battery H1 is fully charged, for example.

After the index value is calculated at step S231, the processing unit 201 provides the machine learning model 2M with the index value calculated at step S231 as a reward, trains the parameters such as weights or the like in the intermediate layer 23 so that the index value is improved (step S233) and ends the processing.

In the second embodiment, according to the flowchart in FIG. 8 and FIG. 9, by being provided with a reward depending on the travel distance, the machine learning model 1M is trained by reinforcement learning so that the electric power consumption efficiency is improved. The communication device 2 properly controls the transmission E in accordance with the information outputted from the machine learning model 2M that has been trained by the reinforcement learning.

The processing unit 201 may be configured to execute the processing from step S205 to step S221 as a learning mode. In the learning mode, the processing unit 201 may update the machine learning model 2M by using as training data the collected input information, the information related to the gear stage outputted from the machine learning model 2M and the details of the evaluation for the gear shift control based on the outputted information related to the gear stage.

By the communication device 2 and the control device 100 in the second embodiment, the distance that can be traveled in a state where the transmission E is automatically changed can be extended while maintaining the comfortability of the user that is adapted to the characteristics of operation by the user of the human-powered vehicle A, and high electric power consumption efficiency of the human-powered vehicle A.

Figure 10:
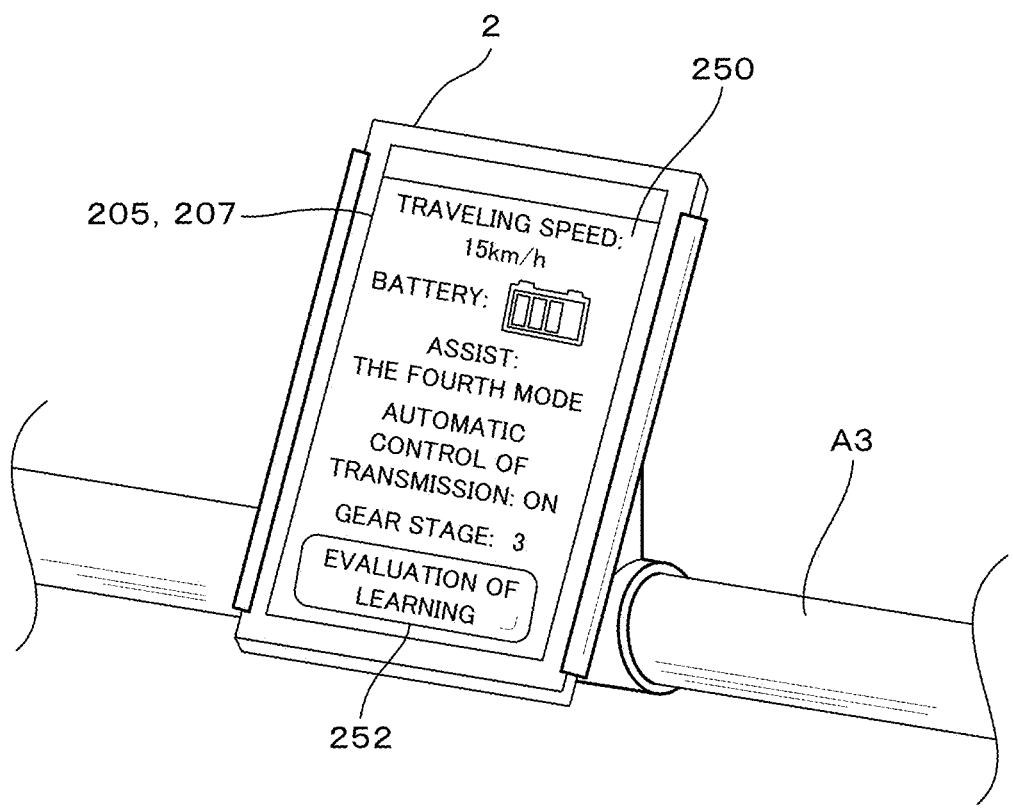
FIG. 10 illustrates a communication device mounted to a handle bar.

As illustrated in FIG. 10, the communication device 2 is mounted to the handle bar A3 so as to allow the user to visually identify the display unit 205A, for example. FIG. 10 shows a main screen 250 displayed on the display unit 205A in accordance with the application program 2P. The processing unit 201 causes the display unit 205A to display the main screen 250 in accordance with the application program 2P. The main screen 250 includes a message indicating a controlled state of a component in addition to the information related to a speed included in the traveling information. The controlled state of a component includes an operating mode of the assist mechanism C and an operating mode of the transmission E, for example. The main screen 250 includes a button image 252 for making an evaluation of learning. For example, if a portion corresponding to the button image 252 of the touch panel device is operated, the processing unit 201 executes processing of receiving an evaluation of the machine learning model 2M shown in the flowcharts in FIG. 8 and FIG. 9 (S217 and S223).

FIG. 11 illustrates one example of an evaluation input screen 254. For example, if a portion corresponding to the button image 252 of the touch panel device is operated, the processing unit 201 causes the display unit 205 to display the evaluation input screen 254. The evaluation input screen 254 includes message information indicating an operation result of the component controlled by the control unit 201 in accordance with the machine learning model 2M. An evaluation input unit is configured to allow the user to input an evaluation indicating the comfortability of the user after the component is operated in accordance with the output information outputted from the machine learning model 2M. The evaluation input screen 254 includes a high evaluation button image 256 and a low evaluation button image 258. The evaluation input unit in the first example includes the operating unit 207. The evaluation input unit in the first example includes a touch panel device disposed so as to be superimposed on the display unit 205, for example. With a touch of the portions corresponding to the high evaluation button image 256 and the portion corresponding to the low evaluation button image 258 with a finger or the like, the evaluation input unit 207 inputs the information related to an evaluation. If the portion corresponding to the high evaluation button image 256 of the touch panel device is operated, the processing unit 201 judges a high evaluation. If the portion corresponding to the low evaluation button image 258 of the touch panel device is operated, the processing unit 201 judges a low evaluation. If no evaluation is received from the user within a preset time period, the processing unit 201 judges no evaluation. The evaluation input screen 254 may only include the low evaluation button image 258 among the high evaluation button image 256 and the low evaluation button image 258.

The evaluation input unit in the second example includes the operating unit D1 of the operating device D. The operating unit D1 may include a special evaluation input button.

The evaluation input unit in the third example includes a microphone of the voice input-output unit 209 and a voice recognition unit 217. The processing unit 201 recognizes information related to the voice of the user recognized by the voice recognition unit 217, thereby receiving an evaluation. The processing unit 201 determines whether or not the control is proper in accordance with the information related to the recognized voice. The processing unit 201 judges a high evaluation if it is determined that the control is properly performed.

The evaluation input unit in the fourth example includes a camera. The communication device 2 includes a camera, for example. The communication device 2 is mounted to the human-powered vehicle A so as to photograph the face of the user by the camera. The processing unit 201 identifies facial expressions of the user from an image acquired by photographing the face of the user with the camera and determines whether the control is proper in accordance with the facial expressions of the user. The processing unit 201 judges a high evaluation if it is determined that the control is proper.

The communication device 2 in the second embodiment enables component control such that the electric power consumption efficiency is improved depending on the way of riding by the user of the human-powered vehicle A as the learning progresses, which allows the user to travel the human-powered vehicle A comfortably for a long time.

The machine learning model 2M in the second embodiment may be configured to output information related to controlling another component. The component 13 to be controlled using the output information may be the assist mechanism C, the seat post F, the suspension G, and brake device J, and is thus not limited to the transmission E. The machine learning model 2M may be configured to output information related to controlling the assist mechanism C that allows the user to comfortably travel the human-powered vehicle A with the amount of electric power consumed in the battery H1 reduced in the case where input information is inputted.

In the second embodiment, the component to be controlled using the output information may include at least two of the transmission E, the assist mechanism C, the seat post F, the suspension G, and the brake device J. The component 13 not to be controlled using the output information among the transmission E, the assist mechanism C, the seat post F, the suspension G, the brake device J, and the like does not necessarily include the electric motor or the electric actuator and may be controlled through a wire.

In the first embodiment and the second embodiment, in the case where the component 13 includes the assist mechanism C, the machine learning model 1M stored in the storage unit 12 in the initial state may be configured to take a minimum assist ratio when the assist mechanism C is controlled by using the output information outputted from the machine learning model 1M. This makes it possible to reduce unnecessary electric power consumption until the machine learning model is trained up to a state suitable for the user.

The expression "at least one" used in the present specification means "one or more" for a desired option. In one example, the expression "at least one" used in the present specification means "only one option" or "both of the two options" for two options. In another example, the expression "at least one" in the present specification means "only one option" or "a combination of any of two or more options" for three or more options.

DESCRIPTION OF REFERENCE CHARACTERS

1 . . . output device
10 . . . processing unit
12 . . . storage unit
14 . . . input-output unit
16 . . . GPS receiving unit
1M, 9M . . . machine learning model
1P, 9P . . . learning program
31 . . . input layer
32 . . . output layer
33 . . . intermediate layer
2 . . . communication device
201 . . . processing unit
203 . . . storage unit
205 . . . display unit
207 . . . evaluation input unit
211 . . . GPS receiving unit
2P, 8P . . . application program
2M, 8M . . . machine learning model
21 . . . input layer
22 . . . output layer
23 . . . intermediate layer
254 . . . evaluation input screen
100 . . . control device
101 . . . processing unit
103 . . . storage unit
105 . . . input-output unit
107 . . . communication unit
A1 . . . frame
C . . . assist mechanism
D . . . operating device
E . . . transmission
E11, E21 . . . drive motor
F . . . seat post
G . . . suspension
S1 . . . speed sensor
S2 . . . acceleration sensor
S3 . . . angle sensor
S4 . . . cadence sensor
S5 . . . torque sensor

The invention claimed is:

1. An output device, comprising:
an acquisition unit that acquires input information related to traveling of a human-powered vehicle; and
a processor configured to train a machine learning model in accordance with an index value indicating electric power consumption efficiency in a power supply device for supplying electric power to a component of the human-powered vehicle, and to output output information related to controlling the component when the input information is inputted, wherein
the processor trains the machine learning model by reinforcement learning using a reward based on the index value, the reward being further based on a value indicating comfortability based on an evaluation for a cadence and a torque of a crank of the human-powered vehicle that is traveling.

2. The output device according to claim 1, wherein the index value is a value related to a travel distance obtained before electric power in the power supply device is equal to or less than a preset value.

3. The output device according to claim 1, wherein the index value is a value related to an amount of electric power outputted from the power supply device.

4. The output device according to claim 1, wherein the output information is information related to at least one of an assist ratio in an assist mechanism configured to assist propulsion of the human-powered vehicle by power supplied from the power supply device and an upper limit value of an assist force by the assist mechanism.

5. The output device according to claim 1, wherein the output information is information related to a gear stage or a gear ratio of a transmission of the human-powered vehicle.

6. The output device according to claim 1, wherein the output information is information related to a number of rotations of an electric motor driven by electric power supplied from the power supply device.

7. The output device according to claim 1, wherein the input information includes at least one of information on the cadence of the crank in the human-powered vehicle, information on the torque of the crank, information on power obtained by calculation using the information on the cadence, and the information on the torque.

8. The output device according to claim 1, wherein the component includes an electric motor driven by electric power supplied from the power supply device, and
the input information is information related to at least one of a torque of the electric motor, an amount of current of the electric motor, a voltage value of the electric motor, and a temperature of the electric motor.

9. The output device according to claim 1, wherein the input information includes information related to an amount of electric power remaining in the power supply device.

10. The output device according to claim 1, wherein the input information includes detection data related to an attitude of the human-powered vehicle.

11. The output device according to claim 1, wherein the input information includes detection data related to a traveling environment of the human-powered vehicle.

12. The output device according to claim 1, wherein output information that allows comfortability of a user for operation of the component of the human-powered vehicle that is traveling to fall within a preset range is outputted in accordance with the output information outputted from the machine learning model.

13. An output device, comprising:
an acquisition unit that acquires input information related to traveling of a human-powered vehicle;
a processor configured to train a machine learning model in accordance with an index value indicating electric power consumption efficiency in a power supply device for supplying electric power to a component of the human-powered vehicle, and to output output information related to controlling the component when the input information is inputted; and
an operating unit that is configured to input operation information for operating the component, wherein
the processor trains the machine learning model by reinforcement learning using the index value as a reward, and
the processor is configured to provide output information with the reward based on collation of the output information outputted from the machine learning model in accordance with input information acquired by the acquisition unit with operation information inputted by the operating unit.

14. An output device, comprising:
an acquisition unit that acquires input information related to traveling of a human-powered vehicle;
a processor configured to train a machine learning model in accordance with an index value indicating electric power consumption efficiency in a power supply device for supplying electric power to a component of the human-powered vehicle, and to output output information related to controlling the component when the input information is inputted;
an output unit that is configured to output the output information related to controlling the component of the human-powered vehicle that is outputted by the machine learning model; and
an evaluation input unit that is configured to input an evaluation indicating comfortability of a user after the component is operated in accordance with the output information, wherein
the machine learning model is configured to be updated in accordance with training data including a detail of the evaluation inputted, the output information outputted from the machine learning model at a timing when the evaluation is inputted, and the input information inputted in accordance with the output information.

15. The output device according to claim 14, wherein the output unit is configured to output the output information indicating a result of controlling the component.

16. A method for generating a machine learning model, comprising:
configuring a neural network to output output information related to controlling a component of a human-powered vehicle when input information related to traveling of the human-powered vehicle is inputted;
acquiring input information related to traveling of the human-powered vehicle;
identifying output information outputted by providing the neural network with the input information acquired;
training a weight in an intermediate layer of the neural network such that an index value indicating electric power consumption efficiency in a power supply device configured to supply electric power to the component is improved when the component is controlled in accordance with the output information identified; and
training the neural network by reinforcement learning using a reward based on the index value, the reward being further based on a value indicating comfortability based on an evaluation for a cadence and a torque of a crank of the human-powered vehicle that is traveling.

17. A computer-readable storage medium comprising instructions configured to be executed by a processor of a computer, to cause the processor to:
configure a neural network to output output information related to controlling a component of a human-powered vehicle when input information related to traveling of the human-powered vehicle is inputted;
acquire input information related to traveling of the human-powered vehicle;
identify output information outputted by providing the neural network with the input information acquired; and
train a weight in an intermediate layer of the neural network such that an index value indicating electric power consumption efficiency in a power supply device configured to supply electric power to the component is improved when the component is controlled in accordance with the output information identified, wherein
the processor trains the neural network by reinforcement learning using a reward based on the index value, the reward being further based on a value indicating comfortability based on an evaluation for a cadence and a torque of a crank of the human-powered vehicle that is traveling.

* * * * *